(12) United States Patent
Motwani et al.

(10) Patent No.: US 11,847,685 B2
(45) Date of Patent: *Dec. 19, 2023

(54) SYSTEMS AND METHODS FOR DETERMINING SUBSTITUTIONS

(71) Applicant: Walmart Apollo, LLC, Bentonville, AR (US)

(72) Inventors: Kamiya Motwani, Sunnyvale, CA (US); Sushant Kumar, San Jose, CA (US); Kannan Achan, Saratoga, CA (US); Vidya Sagar Kalidindi, Milpitas, CA (US); Rahul Ramkumar, Santa Clara, CA (US); Derrick Lagomarsino, San Mateo, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/833,090

(22) Filed: Jun. 6, 2022

(65) Prior Publication Data
US 2022/0301038 A1 Sep. 22, 2022

Related U.S. Application Data

(63) Continuation of application No. 16/287,740, filed on Feb. 27, 2019, now Pat. No. 11,354,719.

(51) Int. Cl.
*G06Q 30/06* (2023.01)
*G06Q 30/0601* (2023.01)

(52) U.S. Cl.
CPC ..... *G06Q 30/0631* (2013.01); *G06Q 30/0627* (2013.01); *G06Q 30/0629* (2013.01)

(58) Field of Classification Search
None
See application file for complete search history.

(56) References Cited

U.S. PATENT DOCUMENTS 7,328,842 B2  2/2008  Wagner et al.
9,202,246 B1  12/2015  Bundy et al.
(Continued)

OTHER PUBLICATIONS

Zhang, W., et al., "Inferring Substitutable Products With Deep Network Embedding," Proceedings of the Twenty-Eighth International Joint Conference on Artificial Intelligence (IJCAI-19), pp. 4306-4312 Oct. 18, 2018.

*Primary Examiner* — Nicholas D Rosen
(74) *Attorney, Agent, or Firm* — BRYAN CAVE LEIGHTON PAISNER LLP

(57) ABSTRACT

A system comprising one or more processors and one or more non-transitory computer-readable media storing computing instructions that, when executed on the one or more processors, cause the one or more processors to perform: determining a list of possible substitutes for an item when the item is out of stock; training a machine learning algorithm, using labeled training data as input and a list of possible substitutes for the item as output; determining, using the machine learning algorithm, as trained, a respective similarity score for each substitute of the list of possible substitutes; determining a respective historical substitution score for each possible substitute; determining a respective final score for each possible substitute comprises using at least one or more rectifiers having ReLU non-linearity; ranking each possible substitute; storing a selection of the highest ranked possible substitute as additional training data with the labeled training data; and re-training the machine learning algorithm. Other embodiments are disclosed herein.

20 Claims, 9 Drawing Sheets

(56) References Cited

U.S. PATENT DOCUMENTS

| | | |
|---|---|---|
| 10,423,861 B2 | 9/2019 | Gao et al. |
| 10,430,854 B2 | 10/2019 | Guo et al. |
| 10,490,182 B1 | 11/2019 | Madhavaraj et al. |
| 10,585,900 B2 | 3/2020 | Byron et al. |
| 11,068,960 B2 | 7/2021 | Xu et al. |
| 11,354,719 B2 * | 6/2022 | Motwani ............. G06Q 30/0629 |
| 11,367,119 B2 * | 6/2022 | Joshi ....................... G06N 20/00 |
| 11,373,231 B2 * | 6/2022 | Soohoo .................. G06V 10/84 |
| 11,455,656 B2 * | 9/2022 | Ma ..................... G06Q 30/0251 |
| 2004/0093274 A1 | 5/2004 | Vanska et al. |
| 2004/0143600 A1 | 7/2004 | Musgrove et al. |
| 2004/0199401 A1 | 10/2004 | Wagner et al. |
| 2009/0049002 A1 | 2/2009 | He et al. |
| 2009/0055330 A1 | 2/2009 | Medasani et al. |
| 2014/0280201 A1 | 9/2014 | Vuong et al. |
| 2017/0193582 A1 | 7/2017 | Guo et al. |
| 2018/0165747 A1 | 6/2018 | Patten et al. |
| 2018/0336386 A1 | 11/2018 | Holub et al. |
| 2019/0012725 A1 | 1/2019 | Chen et al. |
| 2019/0130005 A1 | 5/2019 | Byron et al. |
| 2019/0244088 A1 | 8/2019 | Yang |
| 2020/0250729 A1 | 8/2020 | Soohoo et al. |
| 2020/0250731 A1 | 8/2020 | Soohoo et al. |
| 2020/0380578 A1 | 12/2020 | Xu et al. |
| 2021/0233143 A1 | 7/2021 | Cho et al. |
| 2021/0233145 A1 | 7/2021 | Joshi et al. |
| 2022/0261873 A1 * | 8/2022 | Xu ........................... G06N 5/04 |
| 2022/0277377 A1 * | 9/2022 | Joshi ................. G06Q 30/0633 |

\* cited by examiner

404

701 – Comparing a brand for each suitable substitute with a brand of an item

702 – Comparing an attribute for each suitable substitute with an attribute of an item 703 – Comparing a product for each suitable substitute with a product of an item

801 – Comparing a dietary restriction of each suitable substitute with a dietary restriction of an item 802 – Removing a suitable substitute when a dietary restriction of the suitable substitute does not match a dietary restriction of an item

901 – Determining a number of successful substitutions

902 – Determining a number of unsuccessful substitutions

903 – Calculating an acceptance rate for each suitable substitute

904 – Assigning a historical substitution score

FIG. 9

SYSTEMS AND METHODS FOR DETERMINING SUBSTITUTIONS

CROSS-REFERENCE TO RELATED APPLICATIONS

This application is a continuation of U.S. application Ser. No. 16/287,740 filed Feb. 27, 2019, to be issued as U.S. Pat. No. 11,354,719. U.S. application Ser. No. 16/287,740 is incorporated herein by reference in its entirety.

TECHNICAL FIELD

This disclosure relates generally to determining substitutes over a computer network, and more particularly to using various machine learning algorithms to determine a suitable substitute for an item.

BACKGROUND

Many times, determining substitutions over a computer network can pose a number of problems. How can one determine what products a user will accept as a substitute? How can a computer determine what types of items to recommend as a substitute when a computer cannot qualitatively determine whether two items are similar enough to qualify as a substitute? The following disclosure is aimed at solving one or more of these problems.

BRIEF DESCRIPTION OF THE DRAWINGS

To facilitate further description of the embodiments, the following drawings are provided in which:

FIG. 7 illustrates a flowchart for a method, according to certain embodiments;

FIG. 8 illustrates a flowchart for a method, according to certain embodiments;

FIG. 9 illustrates a flowchart for a method, according to certain embodiments;

Figure 1:
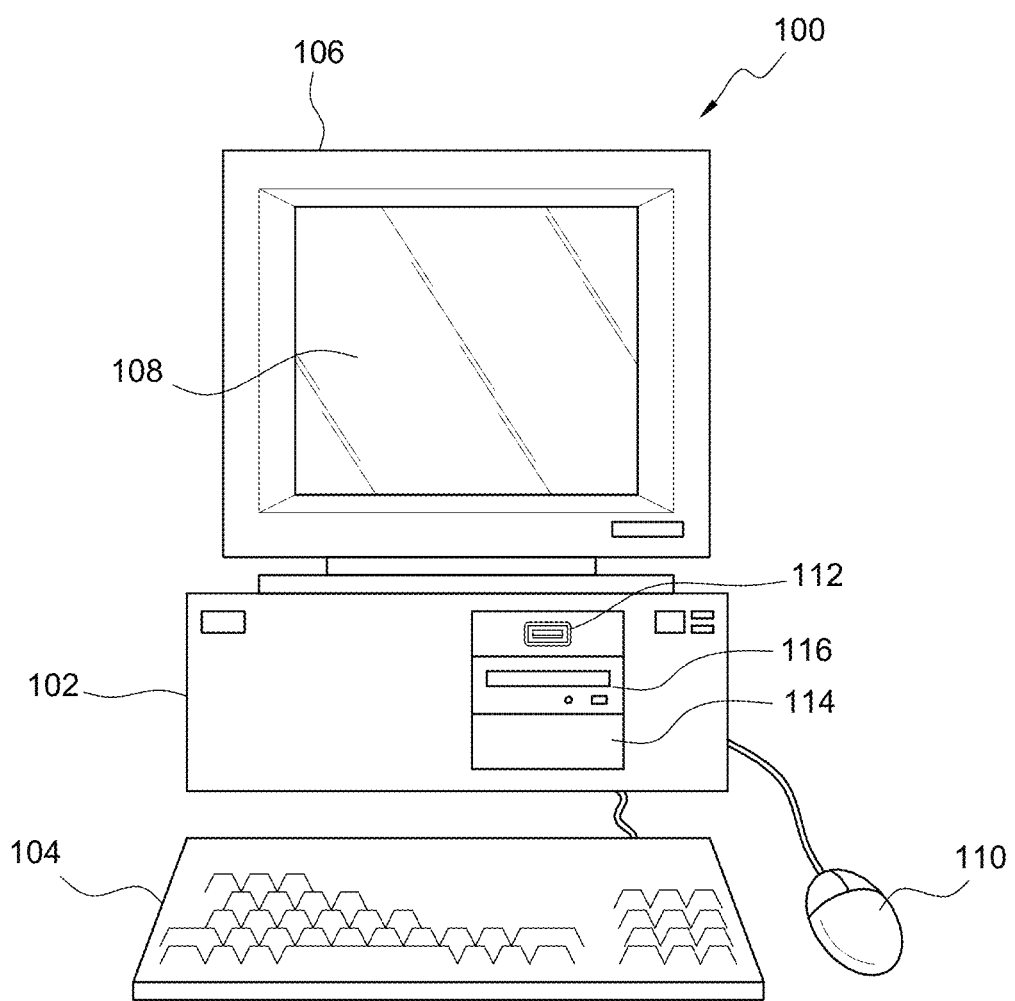
FIG. 1 illustrates a front elevational view of a computer system that is suitable for implementing various embodiments of the systems disclosed in FIGS. 3 and 10-15.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory storage devices storing computing instructions configured to run on the one or more processors. The computing instructions can be configured to run on the one or more processors and perform acts of: determining when an item of a list of items is out of stock; and when the item is out of stock: determining a list of suitable substitutes for the item of the list of items, wherein the list of suitable substitutes can comprise a set of items in an item catalog; determining qualities for each suitable substitute of the list of suitable substitutes; determining a similarity score for each suitable substitute of the list of suitable substitutes; determining a historical substitution score for each suitable substitute of the list of suitable substitutes; determining a final score for each suitable substitute of the list of suitable substitutes using the similarity score for each suitable substitute of the list of suitable substitutes and the historical substitution score for each suitable substitute of the list of suitable substitutes; ranking each suitable substitute of the list of suitable substitutes based upon the final score for each suitable substitute; facilitating a display, on a user interface of a user device, of a highest ranked suitable substitute of the list of suitable substitutes; receiving, from the user interface of the user device, a selection of the highest ranked suitable substitute of the list of suitable substitutes; and after receiving the selection of the highest ranked suitable substitute, substituting the highest ranked suitable substitute of the list of suitable substitutes for the item of the list of items.

Various embodiments include a method. The method can include determining when an item of a list of items is out of stock; and when the item is out of stock: determining a list of suitable substitutes for the item of the list of items, wherein the list of suitable substitutes can comprise a set of items in an item catalog; determining qualities for each suitable substitute of the list of suitable substitutes; determining a similarity score for each suitable substitute of the list of suitable substitutes; determining a historical substitution score for each suitable substitute of the list of suitable substitutes; determining a final score for each suitable substitute of the list of suitable substitutes using the similarity score for each suitable substitute of the list of suitable substitutes and the historical substitution score for each suitable substitute of the list of suitable substitutes; ranking each suitable substitute of the list of suitable substitutes based upon the final score for each suitable substitute; facilitating a display, on a user interface of a user device, of a highest ranked suitable substitute of the list of suitable substitutes; receiving, from the user interface of the user device, a selection of the highest ranked suitable substitute of the list of suitable substitutes; and after receiving the selection of the highest ranked suitable substitute, substituting the highest ranked suitable substitute of the list of suitable substitutes for the item of the list of items.

Several embodiments include a system. A system comprising one or more processors and one or more non-transitory computer-readable media storing computing instructions that, when executed on the one or more processors, cause the one or more processors to perform certain acts. The acts can include determining a list of possible substitutes for an item of a list of items when the item of the list of items is out of stock. The acts also can include training, a machine learning algorithm, using labeled training data as input and a list of possible substitutes for the item of the list of items as output. The acts further can include determining, using the machine learning algorithm, as trained, a respective similarity score for each possible substitute of the list of possible substitutes using the labeled training data. The acts additionally can include determining a respective historical substitution score for each possible substitute of the list of possible substitutes. The acts also can include determining a respective final score for each possible substitute of the list of possible substitutes comprises using at least one or more rectifiers having ReLU nonlinearity that enables training of deep supervised neural networks without unsupervised pre-training. The acts further can include ranking each possible substitute of the list of possible substitutes based upon the respective final score for each possible substitute. The acts additionally can include storing a selection of a highest ranked possible substitute as additional training data with the labeled training data. The acts additionally can include re-training the machine learning algorithm based on the additional training data and the labeled training data.

A number of embodiments include a method. The method being implemented via execution of computing instructions configured to run on one or more processors and stored at one or more non-transitory computer-readable media. The method can include determining a list of possible substitutes for an item of a list of items when the item of the list of items is out of stock. The method also can include training, a machine learning algorithm, using labeled training data as input and a list of possible substitutes for the item of the list of items as output. The method further can include determining, using the machine learning algorithm, as trained, a respective similarity score for each possible substitute of the list of possible substitutes using the labeled training data. The method additionally can include determining a respective historical substitution score for each possible substitute of the list of possible substitutes. The method also can include determining a respective final score for each possible substitute of the list of possible substitutes comprises using at least one or more rectifiers having ReLU nonlinearity that enables training of deep supervised neural networks without unsupervised pre-training. The method further can include ranking each possible substitute of the list of possible substitutes based upon the respective final score for each possible substitute. The method additionally can include storing a selection of a highest ranked possible substitute as additional training data with the labeled training data. The method additionally can include re-training the machine learning algorithm based on the additional training data and the labeled training data.

Figure 2:
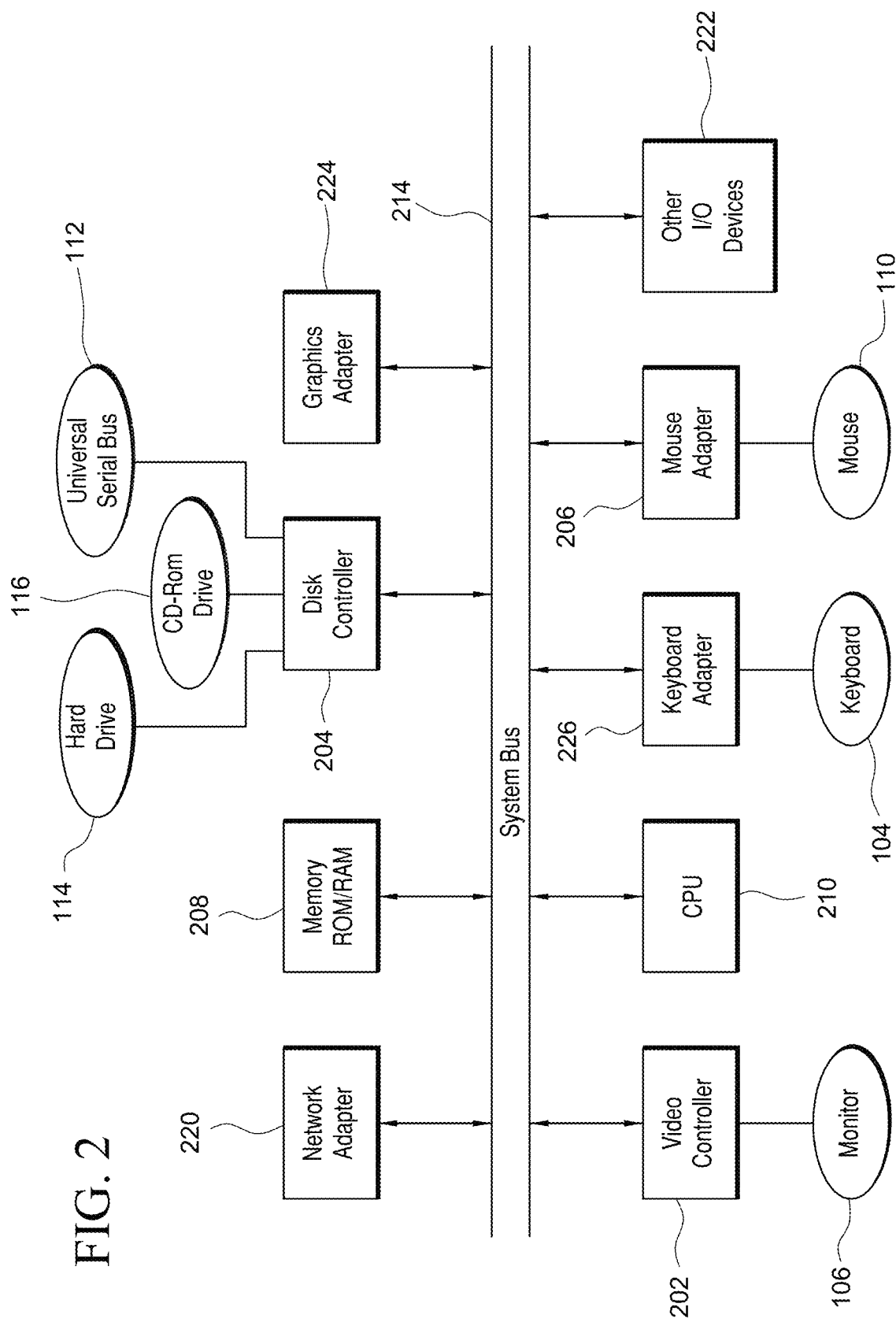
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
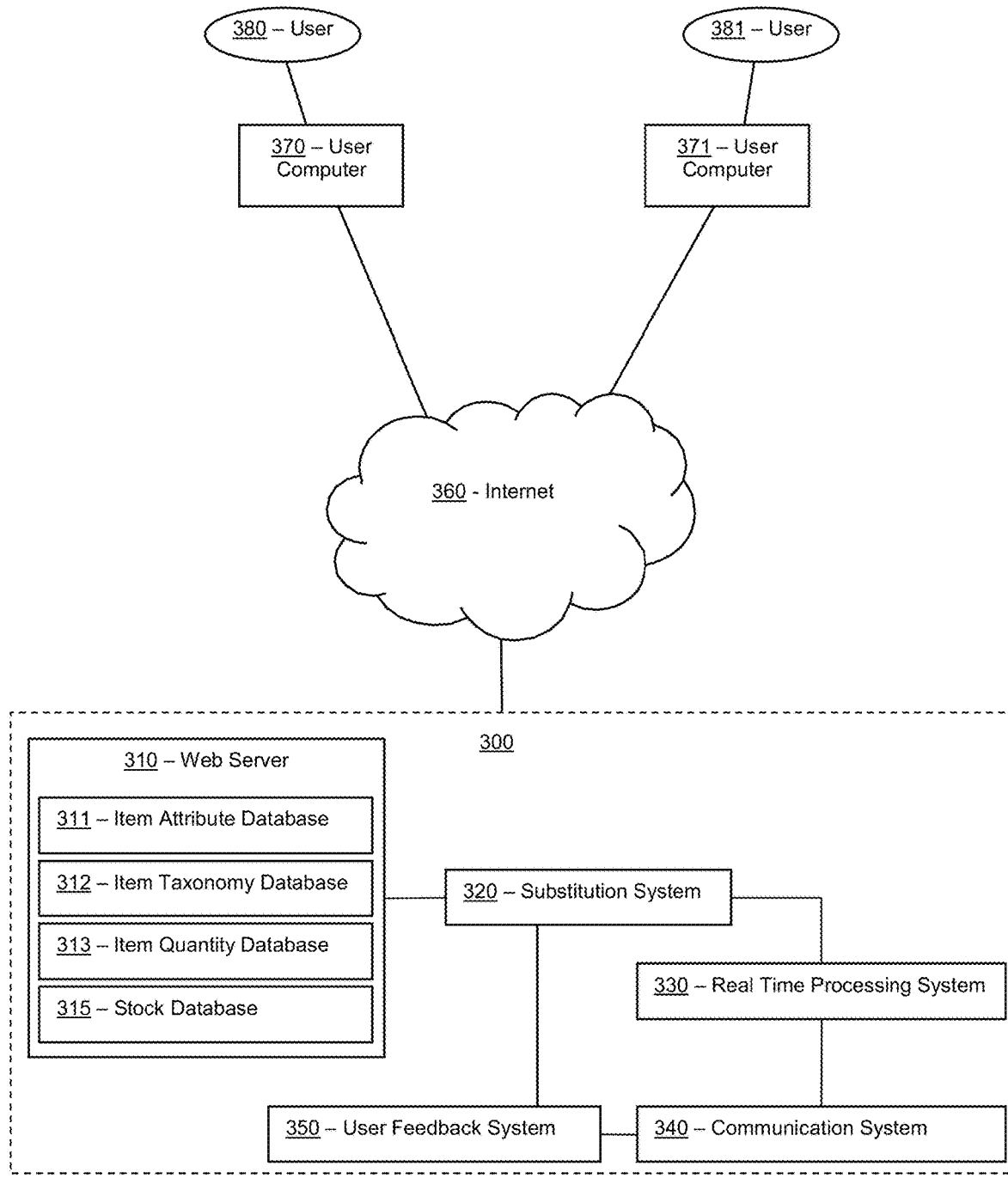
FIG. 3 illustrates a representative block diagram of a system, according to an embodiment.

Turning ahead in the drawings, FIG. 3 illustrates a block diagram of a system 300 that can be employed determining substitutions, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 310, a substitution system 320, a real time processing system 330, a communication system 340, and/or a user feedback system 350. Web server 310, substitution system 320, real time processing system 330, communication system 340, and/or user feedback system 350 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 310, substitution system 320, real time processing system 330, communication system 340, and/or user feedback system 350. Additional details regarding web server 310, substitution system 320, real time processing system 330, communication system 340, and/or user feedback system 350 are described herein.

In many embodiments, system 300 can comprise user computers 370, 371. User computers 370, 371 can comprise any of the elements described in relation to computer system 100. In some embodiments, user computers 370, 371 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In some embodiments, web server 310, substitution system 320, real time processing system 330, communication system 340, and/or user feedback system 350 can be in data communication through Internet 360 with user computers (e.g., 370, 371) and/or each other. In certain embodiments, user computers 370, 371 can be desktop computers, laptop computers, smart phones, tablet devices, and/or other endpoint devices. Web server 310, substitution system 320, real time processing system 330, communication system 340, and/or user feedback system 350 can host one or more websites. For example, web server 310, substitution system 320, real time processing system 330, communication system 340, and/or user feedback system 350 can host an eCommerce website that allows users to browse and/or search for products, to add products to an electronic shopping cart, and/or to purchase products, in addition to other suitable activities.

In many embodiments, web server 310, substitution system 320, real time processing system 330, communication system 340, user feedback system 350, internet 360, and/or user computer 370, 371 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) web server 310, network 320, and/or user computer 370, 371 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 310, network 320, and/or user computer 370, 371. In a similar manner, the processing module(s) and the memory storage module(s) can be local and/or remote to each other.

In many embodiments, web server 310, substitution system 320, real time processing system 330, communication system 340, and/or user feedback system 350 can be configured to communicate with one or more user computers 370, 371. In some embodiments, user computers 370, 371 also can be referred to as customer computers. In some embodiments, web server 310, substitution system 320, real time processing system 330, communication system 340, and/or user feedback system 350 can communicate or interface (e.g., interact) with one or more customer computers (such as user computers 370, 371) through a network or Internet 360. Internet 360 can be an intranet that is not open to the public. Accordingly, in many embodiments, web server 310, substitution system 320, real time processing system 330, communication system 340, and/or user feedback system 350 (and/or the software used by such systems) can refer to a back end of system 300 operated by an operator and/or administrator of system 300, and user computers 370, 371 (and/or the software used by such systems) can refer to a front end of system 300 used by one or more users 380 and 381, respectively. In some embodiments, users 380 and 381 also can be referred to as customers, in which case, user computers 370, 371 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 310, substitution system 320, real time processing system 330, communication system 340, and/or user feedback system 350 internet 360, and/or user computer 370, 371 also can be configured to communicate with and/or store one or more databases, such as item attribute database 311, item taxonomy database 312, item quantity database 313, and/or stock database 315. The one or more databases can comprise a product database that contains information about products, items, or SKUs (stock keeping units) sold (i.e., offered) by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between web server 310, substitution system 320, real time processing system 330, communication system 340, user feedback system 350, internet 360, and/or user computer 370, 371, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide a practical application and several technological improvements. In some embodiments, the techniques described herein can provide for automatic determination of suitable substitutes using specific input data and a machine learning model to provide substitutions in the face of uncertain conditions. These techniques described herein can provide a significant improvement over conventional approaches of manually and or otherwise subjectively determining substitutes, such as guesses about what a user might accept. Moreover, these estimates are improvements over other possible approaches, such as determining substitutes based on perceived user preferences. In many embodiments, the techniques described herein can beneficially make determinations based on dynamic information that describes current conditions and/or conditions that have occurred during the same day of a scheduled pickup.

In many embodiments, the machine learning model can be pre-trained, but also can consider both historical and dynamic input from each store with current data in each time slot. In many embodiments, the technique described herein can estimate suitable substitutes even when no substitutes have been made for an item in the past, based on the use of current, dynamic data.

In many embodiments, the techniques described herein can be used continuously at a scale that cannot be handled using manual techniques. For example, the number of monthly substations at each store can exceed a few thousand.

In a number of embodiments, the techniques described herein can solve a technical problem that arises only within the realm of computer networks, as online orders do not exist outside the realm of computer networks. Moreover, the techniques described herein can solve a technical problem that cannot be solved outside the context of computer networks. Specifically, the techniques described herein cannot be used outside the context of computer networks, in view of a lack of data, and because the machine learning model cannot be performed without a computer.

Figure 4:
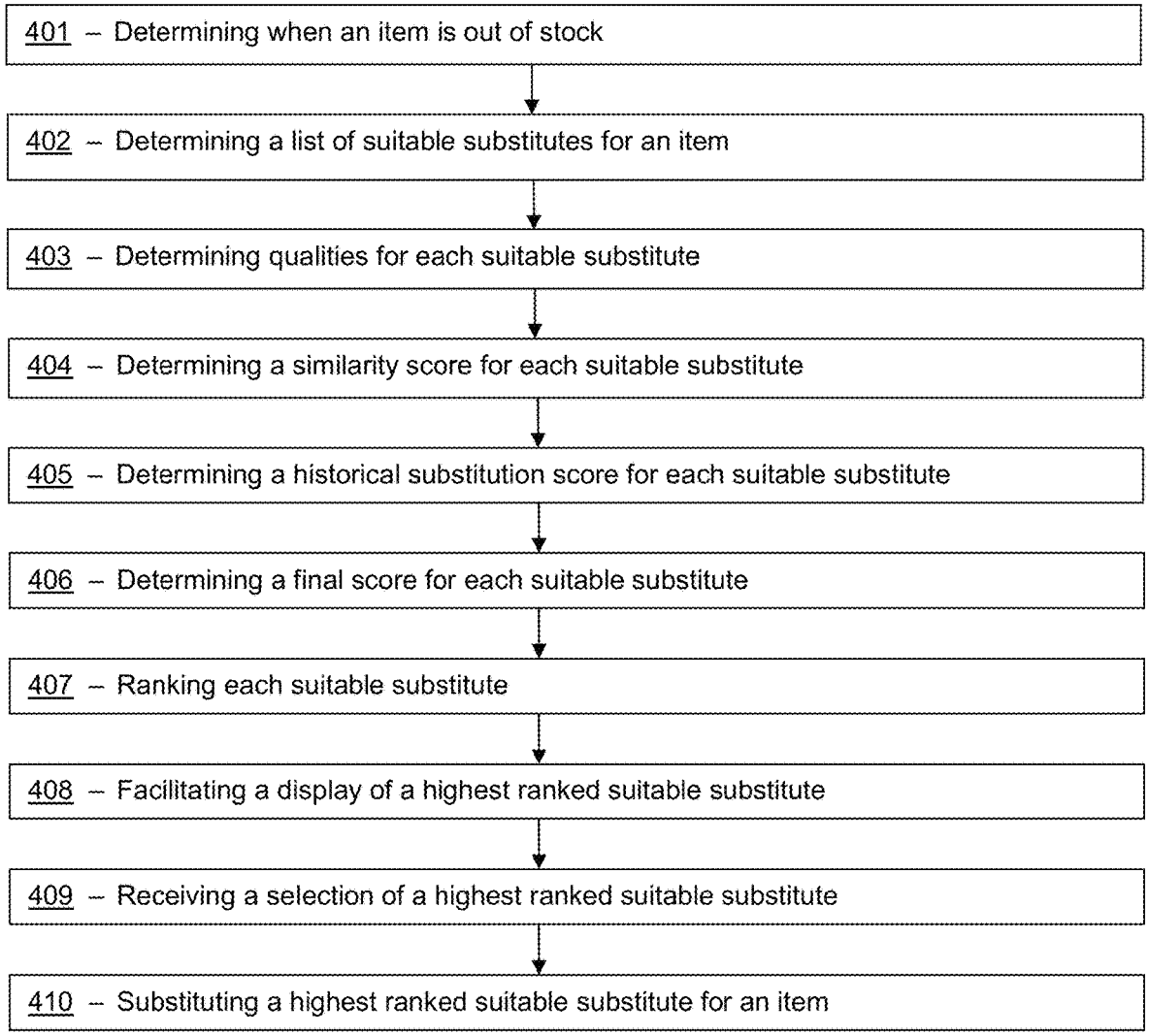
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as web server 310 (FIG. 3), substitution system 320 (FIG. 3), real time processing system 330 (FIG. 3), communication system 340 (FIG. 3), user feedback system 350 (FIG. 3), internet 360 (FIG. 3), and/or user computers 370, 371 (FIG. 3). The processing module(s) can be similar or identical to the processing module(s) described above with respect to computer system 100 (FIG. 1).

In many embodiments, method 400 can comprise an activity 401 of determining when an item is out of stock. In various embodiments, activity 401 can be performed on or by substitute system 320 (FIG. 3). In some embodiments, an item can comprise a product offered by an eCommerce retailer, a product offered by a grocer, a product offered by a department store, and/or a medication offered by a pharmacist. In further embodiments, an item can be a part of a list of items, such as an order placed by a user. In many embodiments, a list of items can be received from user computers 370, 371 (FIG. 3) In the same or different embodiments, an item can be determined as out of stock by querying stock database 315 (FIG. 3). In various embodiments, stock database 315 (FIG. 3) can be configured to store and track numbers of an item available for sale by an eCommerce retailer, a grocer, a department store, and/or a pharmacist. In many embodiments, an item can be determined to be out of stock when stock database 315 (FIG. 3) shows that there are zero of an item for sale and/or when there are insufficient numbers of an item for sale to satisfy an order (e.g., an order for three items when stock database 315 (FIG. 3) shows only one item in stock).

In many embodiments, after activity 401, method 400 can comprise an activity 402 of determining a list of suitable substitutes for an item, particularly the item that is out of stock. In another embodiment, the list of suitable substitutes can be for an item that is not carried by the retailer. In various embodiments, activity 402 can be performed on or by substitute system 320 (FIG. 3). In some embodiments, a suitable substitute for an item can comprise a similar and/or different item. In the same or different embodiments, a suitable substitute can be in a different size and/or weight than an item. In some embodiments, an item catalog can comprise a list of items offered by an eCommerce retailer, a grocer, a department store, and/or a pharmacist. In various embodiments, a list of items offered can be confined to items offered at one physical location of an eCommerce retailer, a grocer, a department store, and/or a pharmacist. In many embodiments, stock for a list of items offered at one physical location can be stored in a stock database.

Figure 5:
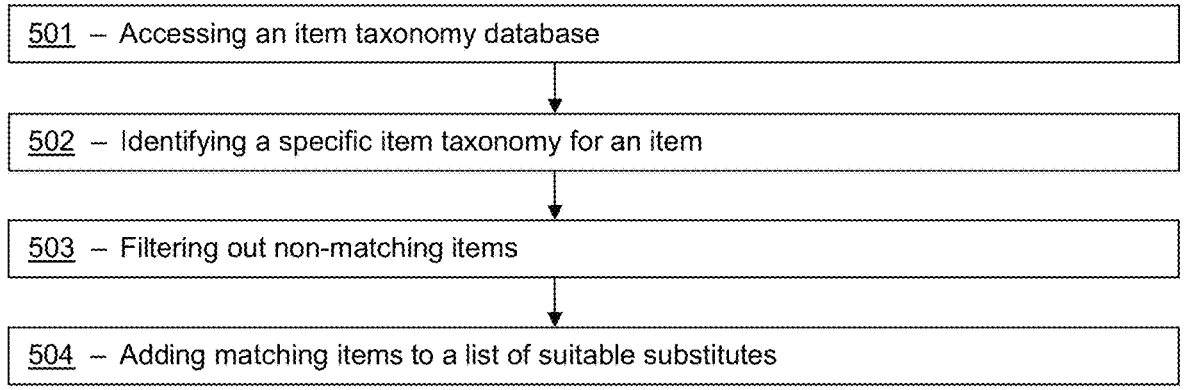
FIG. 5 illustrates a flowchart for a method, according to certain embodiments.

Turning ahead in the drawings, FIG. 5 illustrates a flow chart for activity 402, according to an embodiment. Activity 402 is merely exemplary and is not limited to the embodiments presented herein. Activity 402 can be employed in many different embodiments or examples not specifically depicted or described herein. In some embodiments, the activities of activity 402 can be performed in the order presented. In other embodiments, the activities of activity 402 can be performed in any suitable order. In still other embodiments, one or more of the activities of activity 402 can be combined or skipped. In many embodiments, system 300 (FIG. 3) can be suitable to perform activity 402 and/or one or more of the activities of activity 402. In these or other embodiments, one or more of the activities of activity 402 can be implemented as one or more computer instructions configured to run at one or more processing modules and configured to be stored at one or more non-transitory memory storage modules. Such non-transitory memory storage modules can be part of a computer system such as web server 310 (FIG. 3), substitution system 320 (FIG. 3), real time processing system 330 (FIG. 3), communication system 340 (FIG. 3), user feedback system 350 (FIG. 3), internet 360 (FIG. 3), and/or user computers 370, 371 (FIG. 3). The processing module(s) can be similar or identical to the processing module(s) described above with respect to computer system 100 (FIG. 1).

In many embodiments, activity 402 can comprise an activity 501 of accessing an item taxonomy database. In various embodiments, activity 501 can be performed on or by substitute system 320 (FIG. 3). In some embodiments, an item taxonomy database can comprise item taxonomy database 312 (FIG. 3). In various embodiments, an item taxonomy database can store an item taxonomy for a catalog of items, as described in activity 401 (FIG. 4). In many embodiments, an item taxonomy can be configured to classify a catalog of items based on properties of each item of the catalog of items. In the same or different embodiments, properties of an item can comprise a title, a description, a price, a brand, a manufacturer, a color, a quantity, a volume, and/or a weight. In some embodiments, an item taxonomy can comprise distinct levels of item classification. In further embodiments, distinct levels of item classification can narrow as they go deeper into an item taxonomy. In various embodiments, distinct levels of item classification can comprise a super department, a department, a category, and/or a sub-category. In many embodiments, a department can be deeper in an item taxonomy than a super department. In the same or different embodiments, a category can be deeper in an item taxonomy than a department. In some embodiments, a sub-category can be deeper in an item taxonomy than a category. For example, an item taxonomy for Shamrock Farms whole milk can comprise a super department of "Eggs and Dairy," a department of "Milk," a category of "Dairy Milk," and a sub-category of "Whole Milk."

In many embodiments, activity 402 can comprise an activity 502 of identifying a specific item taxonomy for an item. In various embodiments, activity 502 can be performed on or by substitute system 320 (FIG. 3). In various embodiments, a specific item taxonomy for an item can be stored on an item taxonomy database. In many embodiments, identifying a specific item taxonomy for an item can comprise querying an item taxonomy database for an item taxonomy of an item.

In many embodiments, activity 402 can comprise activity 503 of filtering out non-matching items. In various embodiments, activity 503 can be performed on or by substitute system 320 (FIG. 3). In the same or different embodiments, non-matching items can have a different item taxonomy than an item taxonomy of an item. In various embodiments, an item taxonomy of an item can comprise a specific item taxonomy for an item as identified in activity 502. In the same or different embodiments, a different item taxonomy can comprise an item taxonomy that differs from a specific item taxonomy (as described in activity 503) at a super department, a department, a category, and/or a sub-category level. In many embodiments, items can be removed from and/or not added to a list of suitable substitutes when the items comprise a different item taxonomy.

In many embodiments, activity 402 can comprise activity 504 of adding matching items to a list of suitable substitutes. In various embodiments, activity 503 can be performed on or by substitute system 320 (FIG. 3). In the same or different embodiments, matching items can have a same item taxonomy as an item taxonomy of an item. In various embodiments, an item taxonomy of an item can comprise a specific item taxonomy for an item as identified in activity 502. In the same or different embodiments, a same item taxonomy can comprise an item taxonomy that is partially congruous with or exactly the same as a specific item taxonomy (as described in activity 503) at a super department, a department, a category, and/or a sub-category level. In many embodiments, items can be added to a list of suitable substitutes when the items comprise the same item taxonomy.

Returning now to FIG. 4, in many embodiments, method 400 can continue by comprising activity 403 of determining qualities for each suitable substitute. In various embodiments, activity 403 can be performed on or by substitute system 320 (FIG. 3). In further embodiments, qualities of an item can be stored in item attribute database 311 (FIG. 3). In embodiments where qualities of an item a determined prior to initiating method 400, activity 403 can comprise querying an item attribute database 311 (FIG. 3) to retrieve qualities of an item. In some embodiments, activity 403 can further comprise determining qualities of an item determined to be out of stock as described in activity 401. In many embodiments, qualities of an item can be determined from a title and/or description of an item. In various embodiments, qualities for each suitable substitute can comprise a brand of an item, an attribute of an item, a product of an item, and/or a dietary restriction of an item. In some embodiments, a brand of an item can comprise a mark and/or word identifying a brand name of an item. For example, in an item title comprising "Kellogg's Raisin Bran Crunch Breakfast Cereal," Kellogg's would be considered a brand of the item. In various embodiments, an attribute for an item can comprise a word and/or mark that is descriptive of an item. For example, in an item titled comprising "Kellogg's Raisin Bran Crunch Breakfast Cereal," raisin, bran, crunch, and breakfast would be an attribute of the item. In some embodiments, an attribute for an item can comprise a word and/or mark that cannot be identified as a brand or product. In many embodiments, a product can refer to a class of products to which an item belongs. For example, in an item titled comprising "Kellogg's Raisin Bran Crunch Breakfast Cereal," cereal would be a product of the item. In many embodiments, a dietary restriction can comprise a work and/or mark that identifies a dietary property of an item. For example, a dietary restriction can comprise low fat, sugar free, gluten free, kosher, etc.

Figure 6:
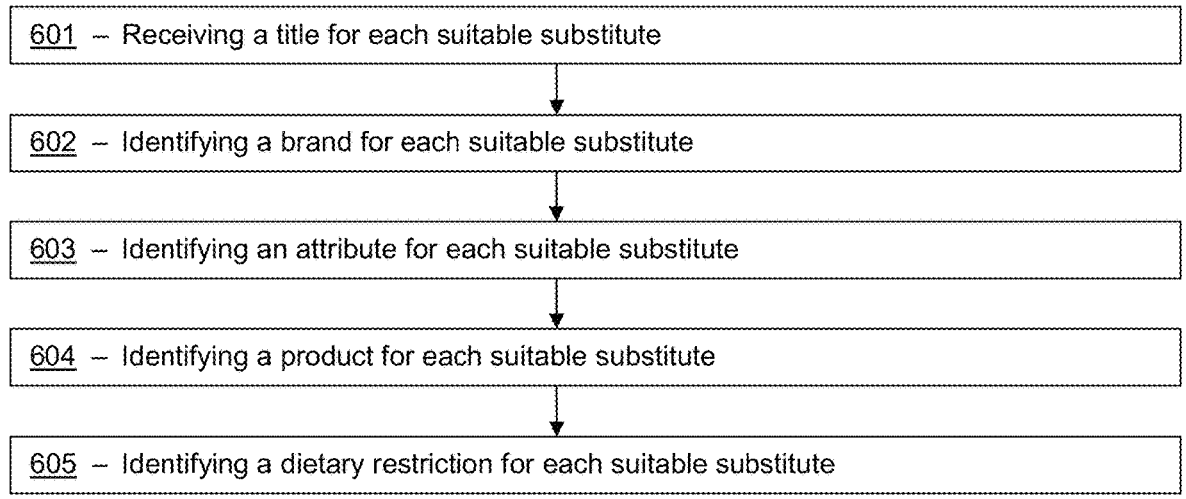
FIG. 6 illustrates a flowchart for a method, according to certain embodiments.

Turning ahead in the drawings, FIG. 6 illustrates a flow chart for an activity 403, according to an embodiment. Activity 403 is merely exemplary and is not limited to the embodiments presented herein. Activity 403 can be employed in many different embodiments or examples not specifically depicted or described herein. In some embodiments, the activities of activity 403 can be performed in the order presented. In other embodiments, the activities of activity 403 can be performed in any suitable order. In still other embodiments, one or more of the activities of activity 403 can be combined or skipped. In many embodiments, system 300 (FIG. 3) can be suitable to perform activity 403 and/or one or more of the activities of activity 403. In these or other embodiments, one or more of the activities of activity 403 can be implemented as one or more computer instructions configured to run at one or more processing modules and configured to be stored at one or more non-transitory memory storage modules. Such non-transitory memory storage modules can be part of a computer system such as web server 310 (FIG. 3), substitution system 320 (FIG. 3), real time processing system 330 (FIG. 3), communication system 340 (FIG. 3), user feedback system 350 (FIG. 3), internet 360 (FIG. 3), and/or user computers 370, 371 (FIG. 3). The processing module(s) can be similar or identical to the processing module(s) described above with respect to computer system 100 (FIG. 1).

In many embodiments, activity 403 can comprise activity 601 of receiving a title for each suitable substitute. In various embodiments, activity 601 can be performed on or by substitute system 320 (FIG. 3). In some embodiments, a title for each suitable substitute can be retrieved from a database, such as item attribute database 311 (FIG. 3), item taxonomy database 312 (FIG. 3), item quantity database 313 (FIG. 3), and/or stock database 315 (FIG. 3). In some embodiments, an item title can be sourced from an item packaging of a physical embodiment of the item. In various embodiments, activity 601 can further comprise receiving a description of an item.

In many embodiments, activity 403 can comprise activity 602 of identifying a brand for each suitable substitute. In various embodiments, activity 602 can be performed on or by substitute system 320 (FIG. 3). In some embodiments, a brand for an item can be identified using a hidden Markov Model ("HMI"). In further embodiments, an HMM used to identify a brand can comprise a left-to-right first-order HMM. In many embodiments, an HMI can determine a probability of a word in a title being an attribute of an item. In the same or different embodiments, when a probability of a word in a title being a brand of an item is above a predetermined threshold, the word in the title can be identified as the brand of the item. In some embodiments, when a probability of a word in a title being a brand of an item is greater than a probability of a word in a title being an attribute, product and/or dietary restriction, the word in the title can be identified as the brand of the item.

In many embodiments, activity 403 can comprise activity 603 of identifying an attribute for each suitable substitute. In various embodiments, activity 603 can be performed on or by substitute system 320 (FIG. 3). In some embodiments, an attribute for an item can be identified using an HMM. In further embodiments, an HMI used to identify an attribute can comprise a left-to-right first-order HMI. In many embodiments, an HMM can determine a probability of a word in a title being an attribute of an item. In the same or different embodiments, when a probability of a word in a title being an attribute of an item is above a predetermined threshold, the word in the title can be identified as the attribute of the item. In some embodiments, when a probability of a word in a title being an attribute of an item is greater than a probability of a word in a title being a brand, product and/or dietary restriction, the word in the title can be identified as the attribute of the item.

In many embodiments, activity 403 can comprise activity 604 of identifying a product for each suitable substitute. In some embodiments, a product for an item can be identified using an HMM. In various embodiments, activity 604 can be performed on or by substitute system 320 (FIG. 3). In further embodiments, an HMM used to identify a product can comprise a left-to-right first-order HMM. In many embodiments, an HMM can determine a probability of a word in a title being a product of an item. In the same or different embodiments, when a probability of a word in a title being a product of an item is above a predetermined threshold, the word in the title can be identified as the product of the item. In some embodiments, when a probability of a word in a title being a product of an item is greater than a probability of a word in a title being a brand, attribute and/or dietary restriction, the word in the title can be identified as the product of the item.

In many embodiments, activity 403 can comprise activity 605 of identifying a dietary restriction for each suitable substitute. In various embodiments, activity 605 can be performed on or by substitute system 320 (FIG. 3). In some embodiments, a dietary restriction for an item can be identified using an HMM. In further embodiments, an HMM used to identify a dietary restriction can comprise a left-to-right first-order HMM. In many embodiments, an HMM can determine a probability of a word in a title being a dietary restriction of an item. In the same or different embodiments, when a probability of a word in a title being a dietary restriction of an item is above a predetermined threshold, the word in the title can be identified as the dietary restriction of the item. In some embodiments, when a probability of a word in a title being a dietary restriction of an item is greater than a probability of a word in a title being a brand, attribute and/or product, the word in the title can be identified as the dietary restriction of the item.

In various embodiments, an HMM can be similar to a Markov model, but states of a process modeled by the HMM are unobserved (i.e., hidden). This makes an HMM particularly advantageous for decoding human language because an entity performing observations (e.g., a computer system and/or system 100 (FIG. 1)) cannot observe qualities of an item because the computer system is not a human and cannot identify parts of speech. A computer system can, though, observe a sequence in which words appear in a product title and/or description. Therefore, qualities of an item can be used as a hidden state, and a sequence of words in a product title and/or description can provide context to the hidden state, and therefore be used to generate a probability of a word in a title and/or description being a specific quality of an item. This lack of being able to identify a part of speech without an HMM is a problem confined only to computer systems that does not exist outside of computer networks. Therefore, an HMM can be seen as chaining together scores or decisions from successive local models to form a global model for an entire sequence of words in a title and/or description of an item.

In many embodiments, an HMM can be trained on labeled training data. In various embodiments, training an HMM can comprise estimating internal parameters of a model configured to determine a quality of an item. In various embodiments, the item can comprise an item determined to be out of stock in activity 401 (FIG. 4) and/or an item deemed a suitable substitute. In various embodiments, a multi-class classifier can be trained using labeled training data otherwise known as a training dataset. In many embodiments, a training dataset can comprise a title and/or description of an item that has had each word labeled with a quality of an item.

In various embodiments, an HMM can comprise an equation comprising: $P(t,w) = \Pi_i P(t_i|t_{i-1}, w_i)$, wherein $P(t,w)$ comprises a probability of a tagged sequence of words, $x = \langle t_i, w \rangle$, for a sequence of words $\{w_0, w_1, w_2, \ldots, w_n\}$, a current quality $t_i$ for an $i^{th}$ word in the sequence of words based on a quality of a previous word $t_{i-1}$ and a current word $w_i$. In many embodiments, the above referenced HMM equation can be re-written as $P(t_1|w_1) * \Pi_{i=2}^{n}(P(t_i|t_{i-1}) * P(t_i|w_i)$, wherein each label applied can depend only on qualities of a current word in a sequence of words and a label of a previous word in the sequence of words. In some embodiments, a previous word in a sequence of words can comprise an immediately preceding word. In various embodiments, a previous word in a sequence of words can comprise a previous word that is not immediately preceding the current word.

Turning ahead in the drawings, FIG. 8 illustrates a flow chart for a method 800, according to an embodiment. Method 800 is merely exemplary and is not limited to the embodiments presented herein. Method 800 can be employed in many different embodiments or examples not specifically depicted or described herein. In some embodiments, the activities of method 800 can be performed in the order presented. In other embodiments, the activities of method 800 can be performed in any suitable order. In still other embodiments, one or more of the activities of method 800 can be combined or skipped. In many embodiments, system 300 (FIG. 3) can be suitable to perform method 800 and/or one or more of the activities of method 800. In these or other embodiments, one or more of the activities of method 800 can be implemented as one or more computer instructions configured to run at one or more processing modules and configured to be stored at one or more non-transitory memory storage modules. Such non-transitory memory storage modules can be part of a computer system such as web server 310 (FIG. 3), substitution system 320 (FIG. 3), real time processing system 330 (FIG. 3), communication system 340 (FIG. 3), user feedback system 350 (FIG. 3), internet 360 (FIG. 3), and/or user computers 370, 371 (FIG. 3). The processing module(s) can be similar or identical to the processing module(s) described above with respect to computer system 100 (FIG. 1). In various embodiments, method 800 can optionally occur after activity 605 (FIG. 6).

In many embodiments, method 800 can comprise an activity 801 of comparing a dietary restriction of each suitable substitute with a dietary restriction of an item. In various embodiments, activity 801 can be performed on or by substitute system 320 (FIG. 3). In some embodiments, the item can comprise an item determined to be out of stock during activity 401 (FIG. 4).

In many embodiments, method 800 can further comprise an activity 802 of removing a suitable substitute when a dietary restriction of the suitable substitute does not match a dietary restriction of an item. In some embodiments, the item can comprise an item determined to be out of stock during activity 401 (FIG. 4). In various embodiments, activity 802 can be performed on or by substitute system 320 (FIG. 3). In further embodiments, a suitable substitute can be removed from a list of suitable substitutes when a dietary restriction of the suitable substitute does not match a dietary restriction of an item. In various embodiments, a mismatch between a dietary restriction of a suitable substitute and a dietary restriction of an item can be determined in activity 801. In some embodiments, a suitable substitute can remain on a list of suitable substitutes even when a dietary restriction of the suitable substitute does not match a dietary restriction of an item because the dietary restriction of the suitable substitute is equivalent to the dietary restriction of the item. For example, a dietary restriction of "1% fat" can be equivalent to a dietary restriction of "low fat," a dietary restriction of "sugar free" can be equivalent to "no sugar," a dietary restriction of "all natural" can be equivalent to "no artificial ingredient," etc. In some embodiments, an equivalence of one or more dietary restrictions can be determined using an HMI, as described in activity 605 (FIG. 6).

Returning now to FIG. 4, in many embodiments, method 400 can continue by comprising an activity 404 of determining a similarity score for each suitable substitute. In some embodiments, determining a similarity score for each suitable substitute can comprise determining one or more other scores as described further below. In some embodiments, activity 404 can be performed on or by substitute system 320 (FIG. 3). In various embodiments, one or more other scores can comprise a title similarity score Turning ahead in the drawings, FIG. 7 illustrates a flow chart for an activity 404, according to an embodiment. Activity 404 is merely exemplary and is not limited to the embodiments presented herein. Activity 404 can be employed in many different embodiments or examples not specifically depicted or described herein. In some embodiments, the activities of activity 404 can be performed in the order presented. In other embodiments, the activities of activity 404 can be performed in any suitable order. In still other embodiments, one or more of the activities of activity 404 can be combined or skipped. In many embodiments, system 300 (FIG. 3) can be suitable to perform activity 404 and/or one or more of the activities of activity 404. In these or other embodiments, one or more of the activities of activity 404 can be implemented as one or more computer instructions configured to run at one or more processing modules and configured to be stored at one or more non-transitory memory storage modules. Such non-transitory memory storage modules can be part of a computer system such as web server 310 (FIG. 3), substitution system 320 (FIG. 3), real time processing system 330 (FIG. 3), communication system 340 (FIG. 3), user feedback system 350 (FIG. 3), internet 360 (FIG. 3), and/or user computers 370, 371 (FIG. 3). The processing module(s) can be similar or identical to the processing module(s) described above with respect to computer system 100 (FIG. 1).

In many embodiments, activity 404 can comprise an activity 701 of comparing a brand for each suitable substitute with a brand of an item. In various embodiments, an item can comprise an item determined to be out of stock in activity 401 (FIG. 4). In the same or different embodiments, activity 701 can be performed on or by substitute system 320 (FIG. 3). In some embodiments, a comparison between a brand for each suitable substitute and a brand for an item can comprise using a logistic regressor. In various embodiments, a logistic regressor can determine a probability that a brand for each suitable substitute is similar to a brand of an item. In the same or different embodiments, a probability that a brand for each suitable substitute is similar to a brand of an item can be used to determine a title similarity score, as described further below.

In many embodiments, activity 404 can comprise an activity 702 of comparing an attribute for each suitable substitute with an attribute of an item. In the same or different embodiments, activity 702 can be performed on or by substitute system 320 (FIG. 3). In various embodiments, an item can comprise an item determined to be out of stock in activity 404. In some embodiments, a comparison between an attribute for each suitable substitute and an attribute for an item can comprise using a logistic regressor. In various embodiments, a logistic regressor can determine a probability that an attribute for each suitable substitute is similar to an attribute of an item. In the same or different embodiments, a probability that an attribute for each suitable substitute is similar to an attribute of an item can be used to determine a title similarity score, as described further below.

In many embodiments, activity 404 can comprise an activity 703 of comparing a product for each suitable substitute with a product of an item. In various embodiments, an item can comprise an item determined to be out of stock in activity 404. In the same or different embodiments, activity 703 can be performed on or by substitute system 320 (FIG. 3). In some embodiments, a comparison between a product for each suitable substitute and a product for an item can comprise using a logistic regressor. In various embodiments, a logistic regressor can determine a probability that a product for each suitable substitute is similar to a product of an item. In the same or different embodiments, a probability that a product for each suitable substitute is similar to a product of an item can be used to determine a title similarity score, as described further below. In many embodiments, a comparison between a product for each suitable substitute and a product for an item can comprise using a feed forward neural network. As compared to a recurrent neural network, a feed forward neural network can comprise a neural network where connections between nodes in the network do not form a cycle. In other words, information is passed through a feed forward neural network in one direction: from input nodes, to hidden nodes when a hidden layer is used, and then to output nodes.

In many embodiments, a logistic regressor can comprise a logistic function. In the same or different embodiments using a logistic regressor can comprise minimizing a cost function using a maximum likelihood estimation technique. In various embodiments, a cost function can comprise an equation comprising: $Cost(\theta) = 1/n \Sigma_{i=1}^{n}[y_i \log(h_\theta(x_i)) + (1-y_i) \log(1-h_\theta(x_i))] + \lambda \|\theta\|^2$, wherein $h_\theta(x_i)$ comprises a sigmoid function, n comprises a number of features in a training data set, $x_i$ comprises an input feature set for a training data set, $y_i$ comprises a binary label for $x_i$, $\theta$ comprises a weight for each feature, and $\lambda$ comprises a regularization constant. In the same or different embodiments, a sigmoid function can comprise: $h_\theta(x_i) = 1/(1+e(-\theta^T x_i))$, where $\theta^T x_i = \theta_0 + \Sigma_{j=1}^{m} \theta_j * x_{ij}$, and T comprises a transpose of $\theta_j$.

In many embodiments, a logistic regressor can be trained on one or more training data sets. In the same or different embodiments, training a logistic regressor can comprise estimating internal parameters of a model configured to determine a probability that a quality for each suitable substitute is similar to a quality of an item. In various embodiments, one or more training datasets can comprise data pre-labeled with a probability that a quality for each suitable substitute is similar to a product of an item. In some embodiments, one or more training datasets can comprise historical acceptance data and/or manually chosen substitute data. In the same or different embodiments, historical acceptance data can comprise information describing when a user has accepted or rejected a substitution at a past time. For example, when a user accepts a substitution, it can be considered a positive example in historical acceptance data (and therefore increase a probability that a quality for a suitable substitute is similar to a quality of an item), but when a user refuses a substitute, it can be considered a negative example in the historical acceptance data (and therefore decrease a probability that a quality for a suitable substitute is similar to a quality of an item). In some embodiments, a logistic regressor can be trained on all positive examples comprising historical acceptance data. In the same or different embodiments, a logistic regressor can be trained on randomly sampled negative examples comprising historical data. In many embodiments, manually chosen substitute data can comprise browse trail data (e.g., click through, item views, conversions, etc.) of users who manually choose a suitable substitute when an item is out of stock. In various embodiments, data pre-labeled with a probability that a quality for each suitable substitute is similar to a product of an item can comprise labels comprising a Jaccard similarity based unigram for a comparison between titles and/or descriptions, a Jaccard similarity based bigram for a comparison between titles and/or descriptions, a Jaccard similarity based trigram for a comparison between titles and/or descriptions, a comparison between all or a part of the item taxonomies, a price difference, and/or a normalized sales rank comparison.

Returning to FIG. 4, in many embodiments, method 400 can continue by comprising an activity 405 of determining a historical substitution score for each suitable substitute. In the same or different embodiments, activity 405 can be performed on or by substitute system 320 (FIG. 3). In many embodiments, a historical substitution score can comprise a historical acceptance rate of suitable substitutions offered to users.

Turning ahead in the drawings, FIG. 9 illustrates a flow chart for a activity 405, according to an embodiment. Activity 405 is merely exemplary and is not limited to the embodiments presented herein. Activity 405 can be employed in many different embodiments or examples not specifically depicted or described herein. In some embodiments, the activities of activity 405 can be performed in the order presented. In other embodiments, the activities of activity 405 can be performed in any suitable order. In still other embodiments, one or more of the activities of activity 405 can be combined or skipped. In many embodiments, system 300 (FIG. 3) can be suitable to perform activity 405 and/or one or more of the activities of activity 405. In these or other embodiments, one or more of the activities of activity 405 can be implemented as one or more computer instructions configured to run at one or more processing modules and configured to be stored at one or more non-transitory memory storage modules. Such non-transitory memory storage modules can be part of a computer system such as web server 310 (FIG. 3), substitution system 320 (FIG. 3), real time processing system 330 (FIG. 3), communication system 340 (FIG. 3), user feedback system 350 (FIG. 3), internet 360 (FIG. 3), and/or user computers 370, 371 (FIG. 3). The processing module(s) can be similar or identical to the processing module(s) described above with respect to computer system 100 (FIG. 1). In various embodiments, activity 405 (FIG. 4) can optionally comprise activity 405.

In many embodiments, activity 405 can comprise an activity 901 of determining a number of successful substitutions. In some embodiments, a number of successful substations can comprise a number of times a suitable substation was selected as a substitution for an item. In various embodiments, a number of successful substitutions can be stored in item attribute database 311 (FIG. 3) and/or user feedback system 350 (FIG. 3).

In many embodiments, activity 405 can comprise an activity 902 of determining a number of unsuccessful substitutions. In some embodiments, a number of unsuccessful substations can comprise a number of times a suitable substation was either not selected as a substitution for an item and/or rejected as a substitution for an item. In various embodiments, a number of unsuccessful substitutions can be stored in item attribute database 311 (FIG. 3) and/or user feedback system 350 (FIG. 3).

In many embodiments, activity 405 can comprise activity 903 of calculating a historical acceptance rate for each suitable substitute. In many embodiments, a historical acceptance rate can comprise a number of successful substitutions divided by a sum of the number of successful substations and a number of unsuccessful substitutions.

In many embodiments, activity 405 can comprise activity 904 of assigning a historical substitution score for each suitable substitute. In various embodiments, a historical substitution score can comprise a historical acceptance rate as determined in activity 903. In some embodiments, assigning a historical substitution score can comprise determining a historical substitution score for each suitable substitute at various temporal resolutions. For example, a historical substitution score can be calculated over a temporal resolution of 1 day, 2 days, 3 days, 4 days, 5 days, 1 month, 2 months, 3 months, 4 months, 5 months, 1 year, 2 years, 3 years, 4 years, 5 years, etc. In many embodiments, a historical substation score can be aggregated over various temporal resolutions. In the same or different embodiments, a historical substitution score can comprise a log of a number of successful substitutes that can be used as a proxy for variance of an acceptance rate for substitutions. In many embodiments, a log of a number of successful substitutes can comprise an equation comprising: $s_{AB\_d} = \log t_{AB\_d}$, wherein A comprises an item determined to be out of stock in activity 401, B comprises a suitable substitute, d comprises a duration of time, $t_{AB\_d}$ comprises a total number of orders where A was substituted with B in the duration of time d. In the same or different embodiments, a log of a number of successful substitutes can be aggregated in a weighted fashion. In many embodiments, aggregating a log of a number of successful substitutes in a weighted fashion can comprise using an equation comprising $s_{AB} = \Sigma_d w_d * s_{AB\_d} / \Sigma_d w_d$, where w comprises a weight vector.

Returning now to FIG. 4, in many embodiments method 400 can continue by comprising an activity 406 of determining a final score for each suitable substitute. In many embodiments, determining a final score can comprise using a similarity score and a historical substitution score. In various embodiments, determining a final score can further comprise using item qualities and/or an acceptance rate. In some embodiments, elements of a final score can be used with a feed forward neural network. For example, a similarity score and/or a historical substitution score for a suitable substitute can be fed into a feed-forward neural network to determine a similarity score. As compared to a recurrent neural network, a feed forward neural network can comprise a neural network where connections between nodes in the network do not form a cycle. In other words, information is passed through a feed forward neural network in one direction: from input nodes, to hidden nodes when a hidden layer is used, and then to output nodes. In more specific embodiments, a feed forward neural network can comprise a neural network having two hidden layers. In some embodiments, each hidden layer can comprise 500 nodes.

In many embodiments, a node of a neural network can have an activation function also known as a rectifier. In the same or different embodiments, a rectifier can comprise a rectified linear unit ("ReLU"). In various embodiments, a node of a neural network can have a ReLU with a non-linear output, otherwise known as ReLU non-linearity. In the same or different embodiments, an activation function for a node of a neural network can comprise $\text{ReLU}(z) = \max(0, z)$. In embodiments where a neural network comprises 3 or more nodes, an output of each layer l, can comprise $z_l = g(a_l)$, where g comprises an activation function and $a_l = \Sigma_k w_{kl} z_k$. In various embodiments, $w_{kl}$ comprises a weight associated with an output of a previous layer in the neural network, and $z_k$ comprises a input into a layer. In many embodiments, an input into a layer can comprise an output from a previous layer. In the same or different embodiments, an activation function can comprise a ReLU.

ReLU non-linearity can provide many advantages over traditional ReLUs. For example, ReLU non-linearity can allow for training of deep supervised neural networks without unsupervised pre-training. This training, though, can increase training time for multi-class classifiers on feed forward neural networks. Therefore, in some embodiments, activity 406 and other activities of method 400 can comprise using a distributed network comprising distributed memory architecture to train a multi-class classifier. This distributed architecture can reduce the impact on the network and system resources to reduce congestion in bottlenecks while still allowing data to be accessible from a central location. Use of distributed networks for training a multi-class classifier are especially applicable when ReLU non-linearity is used, as computation of large datasets can reduce processing speeds and increase processing burdens on single processor computer systems. In some embodiments, activity 406 and other activities in method 400 can comprise using a distributed network comprising distributed memory architecture to train a multi-class classifier. This distributed architecture can reduce the impact on the network and system resources to reduce congestion in bottlenecks while still allowing data to be accessible from a central location. Use of distributed networks are especially applicable for training a multi-class classifier, as computation of large datasets can reduce processing speeds and increase processing burdens on single processor computer systems.

In many embodiments, method 400 can comprise an activity 407 of ranking each substitute. In some embodiments, each substitute can be ranked based on a similarity score as determined in activity 404, a historical substitution score as determined in activity 405, and/or a final score as determined in activity 406. In the same or different embodiments, each substitute can be ranked from highest to lowest based on a final score. In various embodiments, each substitute can be ranked from lowest to highest based on a final score. In many embodiments, when two or more items comprise a similar or identical final score, a quantity ratio can be used to determine a highest ranked substitute. In some embodiments, when two or more items comprise a similar or identical final score, an item with a lowest quantity ratio can be determined to be a highest ranked substitute. In the same or different embodiments, when two or more items comprise a similar or identical final score, an item with a highest quantity ratio can be determined to be a highest ranked substitute. In various embodiments, when two or more items comprise a similar or identical final score, an item with a quantity ratio closest to one can be determined to be a highest ranked substitute.

In many embodiments, activity 407 can further comprise determining a quantity ratio. In the same or different embodiments, activity 407 can be performed on or by substitute system 320 (FIG. 3). In some embodiments, a quantity ratio can comprise a ratio of a total count of an item determined to be out of stock in activity 401 to a total count of a suitable substitute (or vice versa). In the same or different embodiments, a quantity ratio can comprise a ratio of a total weight of an item determined to be out of stock in activity 401 to a total weight of a suitable substitute (or vice versa). In various embodiments, a total weight of an item can comprise a weight per container of the item multiplied by a number of containers (i.e., a count) of the item in a package. In the same or different embodiments, a quantity ratio can comprise a ratio of a total quantity of an item determined to be out of stock in activity 401 to a total quantity of a suitable substitute (or vice versa). In various embodiments, a total volume of an item can comprise a volume per container of the item multiplied by a number of containers (i.e., a count) of the item in a package. In many embodiments, a weight, total weight, volume, and/or total volume of an item can be converted to ounces ("oz") before a quantity ratio is calculated. By converting volumes and weights to oz before calculating a quantity ratio, the quantity ratio can be standardized and normalized. Further, because only one type of unit is used to calculate a quantity ratio, an amount of computer code needed to program an algorithm to calculate the quantity ratio can be reduced, thereby improving a processing speed of a computer when computing a quantity ratio. In many embodiments, when a quantity ratio cannot be determined, the quantity ratio can comprise 1.0.

In many embodiments, method 400 can comprise an activity 408 of facilitating a display of a highest rated or ranked substitute. In further embodiments, a highest ranked substitute can comprise a list of highest ranked substitutes. In some embodiments, a highest ranked substitute can be displayed to a user on a user device 370, 371 (FIG. 3). In various embodiments, a highest ranked substitute can be displayed on a graphical user interface ("GUI") displayed on an electronic device. In the same or different embodiments, a GUI can be part of and/or displayed by user computers 370, 371 (FIG. 3), which also can be part of system 300. In some embodiments, a GUI can comprise text and/or graphics (image) based user interfaces. In the same or different embodiments, a GUI can comprise a heads up display ("HUD"). When a GUI comprises a HUD, the GUI can be projected onto glass or plastic, displayed in midair as a hologram, or displayed on monitor 106 (FIG. 1). In various embodiments, a GUI can be color or black and white. In many embodiments, a GUI can comprise an application running on a computer system, such as computer system 100 (FIG. 1) and/or user computers 370, 371 (FIG. 1). In the same or different embodiments, a GUI can comprise a website accessed through internet 360. In some embodiments, a GUI can comprise an eCommerce website. In the same or different embodiments, a GUI can be displayed as or on a virtual reality (VR) and/or augmented reality (AR) system or display. In some embodiments, a highest ranked substitute can be displayed on an electronic device of an employee of a grocer and/or an eCommerce retailer, including an automated order fulfillment system, performing a substitution as described in activity 410 below.

In many embodiments, method 400 can continue by comprising activity 409 of receiving a selection of a highest ranked suitable substitute. In some embodiments, an acceptance can be entered into a GUI as described in activity 408, and the acceptance can be transmitted to the system, such as substitution system 320 (FIG. 3). In the same or different embodiments, a user and/or customer can accept a highest ranked substitute by selecting a selectable element displayed on a GUI. In various embodiments, a highest ranked substitute can be selected by an employee of a grocer, department store, pharmacy, and/or an eCommerce retailer. In the same or different embodiments, activity 409 can comprise receiving a rejection of a highest ranked substitute. In some embodiments, a rejection can be entered into a GUI as described in activity 408. In the same or different embodiments, a user and/or customer can reject a highest ranked substitute by selecting a selectable element displayed on a GUI. In various embodiments, a highest ranked substitute can be selected by an employee of a grocer, department store, pharmacy, and/or an eCommerce retailer. In embodiments where a highest ranked suitable substitute is rejected, activity 408 can be performed again, and a next highest ranked suitable substitute can be shown instead of a highest ranked suitable substitute. In many embodiments, an acceptance or rejection of a suitable substitute can subsequently be used in activities 901-904 (FIG. 9) to calculate a historical substitution score.

Next, in many embodiments, method 400 can comprise activity 410 of substituting a highest ranked suitable substitute (or other substitute selected by the user and/or customer) for an item. In various embodiments, a highest ranked suitable substitute can be substituted by an employee of a grocer, department store, pharmacy, and/or an eCommerce retailer, including an automated order fulfillment system. In some embodiments, substituting a highest ranked suitable substitute for an item can comprise placing a highest ranked suitable substitute in an order of a user in place of an item determined to be out of stock in activity 401.

Figure 10:
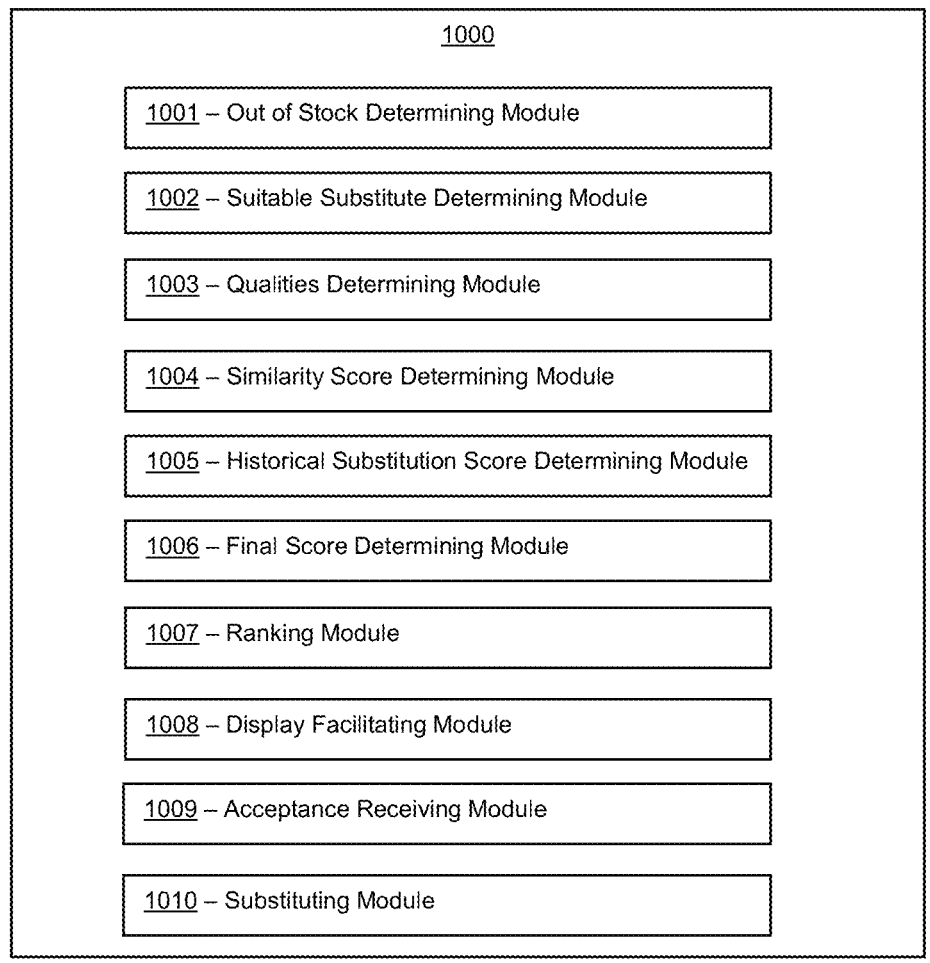
FIG. 10 illustrates a representative block diagram of a system, according to an embodiment.

Turning now to FIG. 10, a block diagram of a system 1000 that can be employed for making substitutions. System 1000 is merely exemplary and embodiments of the system are not limited to the embodiments presented herein. System 1000 can be employed in many different embodiments or examples not specifically depicted or described herein. In some embodiments, certain elements or modules of system 1000 can perform various procedures, processes, and/or activities. In these or other embodiments, the procedures, processes, and/or activities can be performed by other suitable elements or modules of system 1000.

Generally, therefore, system 1000 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 1000 described herein.

In many embodiments, system 1000 can comprise non-transitory memory storage module 1001. Memory storage module 1001 can be referred to as out of stock determining module 1001. In many embodiments, out of stock determining module 1001 can store computing instructions configured to run on one or more processing modules and perform one or more acts of method 400 (FIG. 4) (e.g., activity 401 (FIG. 4)).

In many embodiments, system 1000 can comprise non-transitory memory storage module 1002. Memory storage module 1002 can be referred to as suitable substitute determining module 1002. In many embodiments, suitable substitute determining module 1002 can store computing instructions configured to run on one or more processing modules and perform one or more acts of method 400 (FIG. 4) (e.g., activity 402 (FIG. 4)).

In many embodiments, system 1000 can comprise non-transitory memory storage module 1003. Memory storage module 1003 can be referred to as qualities determining module 1003. In many embodiments, qualities determining module 1003 can store computing instructions configured to run on one or more processing modules and perform one or more acts of method 400 (FIG. 4) (e.g., activity 403 (FIG. 4)).

In many embodiments, system 1000 can comprise non-transitory memory storage module 1004. Memory storage module 1004 can be referred to as similarity score determining module 1004. In many embodiments, similarity score determining module 1004 can store computing instructions configured to run on one or more processing modules and perform one or more acts of method 400 (FIG. 4) (e.g., activity 404 (FIG. 4)).

In many embodiments, system 1000 can comprise non-transitory memory storage module 1005. Memory storage module 1005 can be referred to as historical substitution score determining module 1005. In many embodiments, historical substitution score determining module 1005 can store computing instructions configured to run on one or more processing modules and perform one or more acts of method 400 (FIG. 4) (e.g., activity 405 (FIG. 4)).

In many embodiments, system 1000 can comprise non-transitory memory storage module 1006. Memory storage module 1006 can be referred to as final score determining module 1006. In many embodiments, final score determining module 1006 can store computing instructions configured to run on one or more processing modules and perform one or more acts of method 400 (FIG. 4) (e.g., activity 406 (FIG. 4)).

In many embodiments, system 1000 can comprise non-transitory memory storage module 1007. Memory storage module 1007 can be referred to as ranking module 1007. In many embodiments, ranking module 1007 can store computing instructions configured to run on one or more processing modules and perform one or more acts of method 400 (FIG. 4) (e.g., activity 407 (FIG. 4)).

In many embodiments, system 1000 can comprise non-transitory memory storage module 1008. Memory storage module 1008 can be referred to as display facilitating module 1008. In many embodiments, display facilitating module 1008 can store computing instructions configured to run on one or more processing modules and perform one or more acts of method 400 (FIG. 4) (e.g., activity 408 (FIG. 4)).

In many embodiments, system 1000 can comprise non-transitory memory storage module 1009. Memory storage module 1009 can be referred to as acceptance receiving module 1009. In many embodiments, acceptance receiving module 1009 can store computing instructions configured to run on one or more processing modules and perform one or more acts of method 400 (FIG. 4) (e.g., activity 409 (FIG. 4)).

In many embodiments, system 1000 can comprise non-transitory memory storage module 1010. Memory storage module 1010 can be referred to as substituting module 1010. In many embodiments, substituting module 1010 can store computing instructions configured to run on one or more processing modules and perform one or more acts of method 400 (FIG. 4) (e.g., activity 410 (FIG. 4)).

Figure 11:
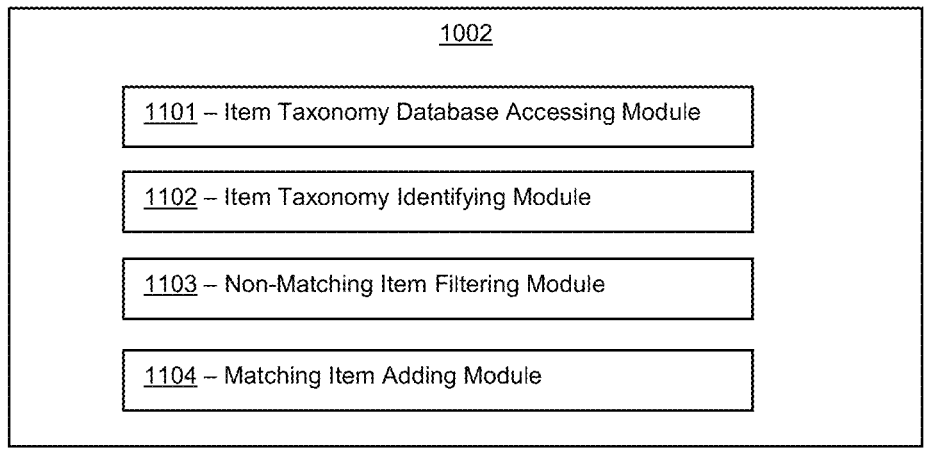
FIG. 11 illustrates a representative block diagram of a system, according to an embodiment.

Turning now to FIG. 11, a block diagram of memory storage module 1002 that can be employed for making substitutions. Memory storage module 1002 is merely exemplary and embodiments of the system are not limited to the embodiments presented herein. Memory storage module 1002 can be employed in many different embodiments or examples not specifically depicted or described herein. In some embodiments, certain elements or modules of memory storage module 1002 can perform various procedures, processes, and/or activities. In these or other embodiments, the procedures, processes, and/or activities can be performed by other suitable elements or modules of memory storage module 1002.

Generally, therefore, memory storage module 1002 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of memory storage module 1002 described herein. In many embodiments, memory storage module 1002 can be referred to as suitable substitute determining system.

In many embodiments, memory storage module 1002 can comprise non-transitory memory storage module 1101. Memory storage module 1101 can be referred to as item taxonomy database accessing module 1101. In many embodiments, item taxonomy database accessing module 1101 can store computing instructions configured to run on one or more processing modules and perform one or more acts of activity 402 (FIG. 5) (e.g., activity 501 (FIG. 5)).

In many embodiments, memory storage module 1002 can comprise non-transitory memory storage module 1102. Memory storage module 1102 can be referred to as item taxonomy identifying module 1102. In many embodiments, item taxonomy identifying module 1102 can store computing instructions configured to run on one or more processing modules and perform one or more acts of activity 402 (FIG. 5) (e.g., activity 502 (FIG. 5)).

In many embodiments, memory storage module 1002 can comprise non-transitory memory storage module 1103. Memory storage module 1103 can be referred to as non-matching item filtering module 1103. In many embodiments, non-matching item filtering module 1103 can store computing instructions configured to run on one or more processing modules and perform one or more acts of activity 402 (FIG. 5) (e.g., activity 503 (FIG. 5)).

In many embodiments, memory storage module 1002 can comprise non-transitory memory storage module 1104. Memory storage module 1104 can be referred to as matching item adding module 1104. In many embodiments, matching item adding module 1104 can store computing instructions configured to run on one or more processing modules and perform one or more acts of activity 402 (FIG. 5) (e.g., activity 504 (FIG. 5)).

Figure 12:
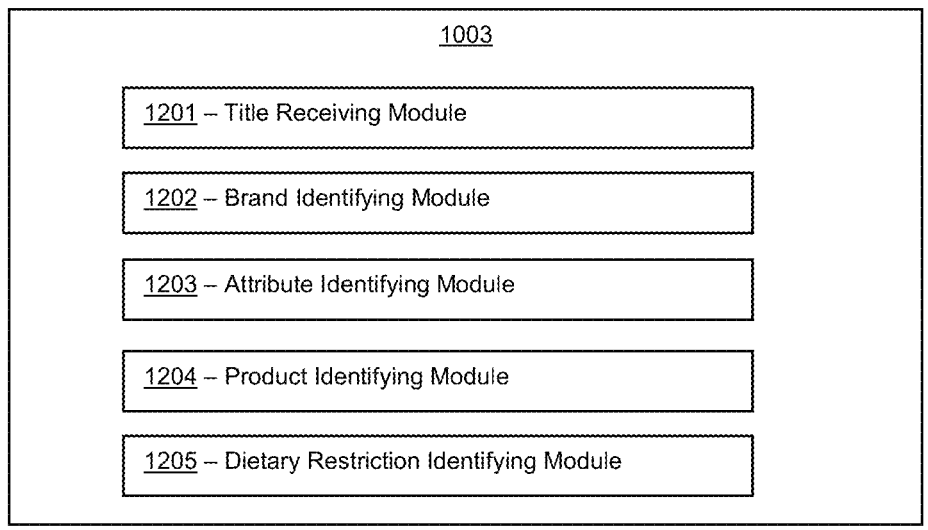
FIG. 12 illustrates a representative block diagram of a system, according to an embodiment.

Turning now to FIG. 12, a block diagram of memory storage module 1003 that can be employed for making substitutions. Memory storage module 1003 is merely exemplary and embodiments of the system are not limited to the embodiments presented herein. Memory storage module 1003 can be employed in many different embodiments or examples not specifically depicted or described herein. In some embodiments, certain elements or modules of memory storage module 1003 can perform various procedures, processes, and/or activities. In these or other embodiments, the procedures, processes, and/or activities can be performed by other suitable elements or modules of memory storage module 1003. In many embodiments, memory storage module 1003 can be referred to as qualities determining system.

Generally, therefore, memory storage module 1003 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of memory storage module 1003 described herein.

In many embodiments, memory storage module 1003 can comprise non-transitory memory storage module 1201. Memory storage module 1201 can be referred to as title receiving module 1201. In many embodiments, title receiving module 1201 can store computing instructions configured to run on one or more processing modules and perform one or more acts of activity 403 (FIG. 6) (e.g., activity 601 (FIG. 6)).

In many embodiments, memory storage module 1003 can comprise non-transitory memory storage module 1202. Memory storage module 1202 can be referred to as brand identifying module 1202. In many embodiments, brand identifying module 1202 can store computing instructions configured to run on one or more processing modules and perform one or more acts of activity 403 (FIG. 6) (e.g., activity 602 (FIG. 6)).

In many embodiments, memory storage module 1003 can comprise non-transitory memory storage module 1203. Memory storage module 1203 can be referred to as attribute identifying module 1203. In many embodiments, non-matching attribute identifying module 1203 can store computing instructions configured to run on one or more processing modules and perform one or more acts of activity 403 (FIG. 6) (e.g., activity 603 (FIG. 6)).

In many embodiments, memory storage module 1003 can comprise non-transitory memory storage module 1204. Memory storage module 1204 can be referred to as product identifying module 1204. In many embodiments, product identifying module 1203 can store computing instructions configured to run on one or more processing modules and perform one or more acts of activity 403 (FIG. 6) (e.g., activity 604 (FIG. 6)).

In many embodiments, memory storage module 1003 can comprise non-transitory memory storage module 1205. Memory storage module 1205 can be referred to as dietary restriction identifying module 1205. In many embodiments, dietary restriction identifying module 1205 can store computing instructions configured to run on one or more processing modules and perform one or more acts of activity 403 (FIG. 6) (e.g., activity 605 (FIG. 6)).

Figure 13:
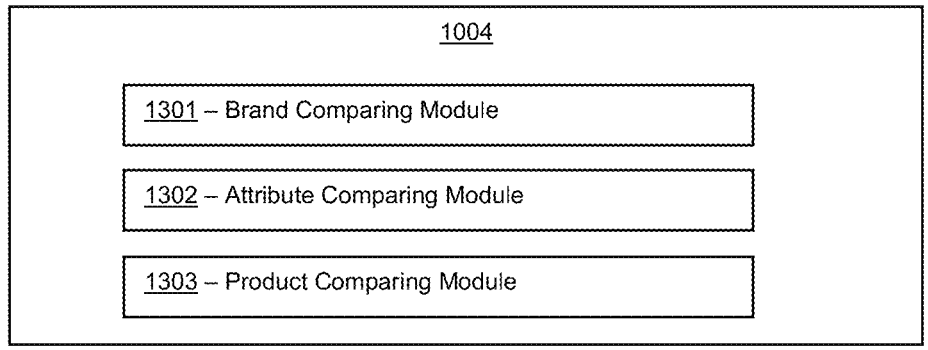
FIG. 13 illustrates a representative block diagram of a system, according to an embodiment.

Turning now to FIG. 13, a block diagram of memory storage module 1004 that can be employed for making substitutions. Memory storage module 1004 is merely exemplary and embodiments of the system are not limited to the embodiments presented herein. Memory storage module 1004 can be employed in many different embodiments or examples not specifically depicted or described herein. In some embodiments, certain elements or modules of memory storage module 1004 can perform various procedures, processes, and/or activities. In these or other embodiments, the procedures, processes, and/or activities can be performed by other suitable elements or modules of memory storage module 1004. In many embodiments, memory storage module 1004 can be referred to as similarity score determining system.

Generally, therefore, memory storage module 1004 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of memory storage module 1004 described herein.

In many embodiments, memory storage module 1004 can comprise non-transitory memory storage module 1301. Memory storage module 1301 can be referred to as brand comparing module 1301. In many embodiments, brand comparing module 1301 can store computing instructions configured to run on one or more processing modules and perform one or more acts of activity 404 (FIG. 7) (e.g., activity 701 (FIG. 7)).

In many embodiments, memory storage module 1004 can comprise non-transitory memory storage module 1302. Memory storage module 1302 can be referred to as attribute comparing module 1302. In many embodiments, attribute comparing module 1302 can store computing instructions configured to run on one or more processing modules and perform one or more acts of activity 404 (FIG. 7) (e.g., activity 702 (FIG. 7)).

In many embodiments, memory storage module 1004 can comprise non-transitory memory storage module 1303. Memory storage module 1303 can be referred to as product comparing module 1303. In many embodiments, product comparing module 1303 can store computing instructions configured to run on one or more processing modules and perform one or more acts of activity 404 (FIG. 7) (e.g., activity 703 (FIG. 7)).

Figure 14:
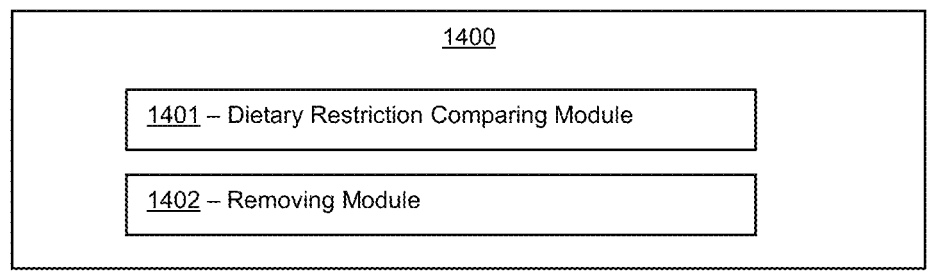
FIG. 14 illustrates a representative block diagram of a system, according to an embodiment.

Turning now to FIG. 14, a block diagram of a system 1400 that can be employed for making substitutions. System 1400 is merely exemplary and embodiments of the system are not limited to the embodiments presented herein. System 1400 can be employed in many different embodiments or examples not specifically depicted or described herein. In some embodiments, certain elements or modules of system 1400 can perform various procedures, processes, and/or activities. In these or other embodiments, the procedures, processes, and/or activities can be performed by other suitable elements or modules of system 1400.

Generally, therefore, system 1400 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 1400 described herein.

In many embodiments, system 1400 can comprise non-transitory memory storage module 1401. Memory storage module 1401 can be referred to as dietary restriction comparing module 1401. In many embodiments, dietary restriction comparing module 1401 can store computing instructions configured to run on one or more processing modules and perform one or more acts of method 800 (FIG. 8) (e.g., activity 801 (FIG. 8)).

In many embodiments, system 1400 can comprise non-transitory memory storage module 1402. Memory storage module 1402 can be referred to as removing module 1402. In many embodiments, removing module 1402 can store computing instructions configured to run on one or more processing modules and perform one or more acts of method 800 (FIG. 8) (e.g., activity 802 (FIG. 8)).

Figure 15:
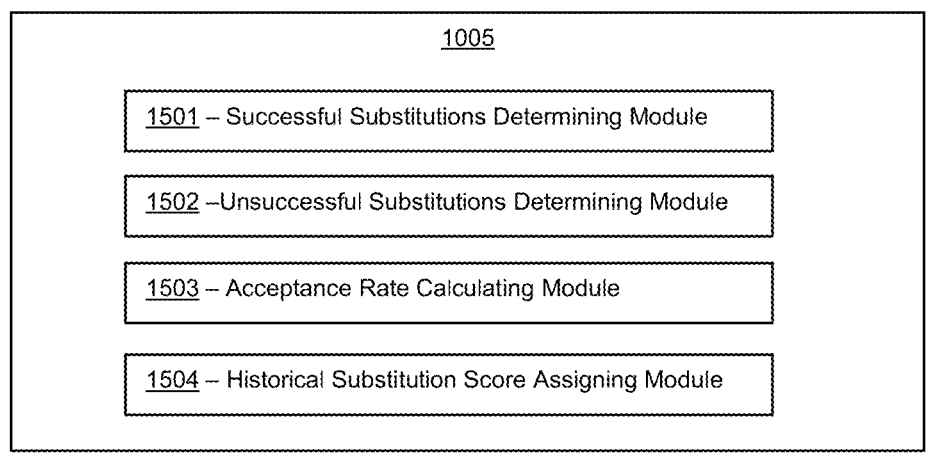
FIG. 15 illustrates a representative block diagram of a system, according to an embodiment.

Turning to FIG. 15, a block diagram of memory storage module 1005 that can be employed for making substitutions. Memory storage module 1005 is merely exemplary and embodiments of the system are not limited to the embodiments presented herein. Memory storage module 1005 can be employed in many different embodiments or examples not specifically depicted or described herein. In some embodiments, certain elements or modules of memory storage module 1005 can perform various procedures, processes, and/or activities. In these or other embodiments, the procedures, processes, and/or activities can be performed by other suitable elements or modules of memory storage module 1005.

Generally, therefore, memory storage module 1005 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of memory storage module 1005 described herein. In many embodiments, memory storage module 1005 can be referred to as historical substation score determining system.

In many embodiments, memory storage module 1005 can comprise non-transitory memory storage module 1501. Memory storage module 1501 can be referred to as successful substitutions determining module 1501. In many embodiments, successful substitutions determining module 1501 can store computing instructions configured to run on one or more processing modules and perform one or more acts of activity 405 (FIG. 9) (e.g., activity 901 (FIG. 9)).

In many embodiments, memory storage module 1005 can comprise non-transitory memory storage module 1502. Memory storage module 1502 can be referred to as unsuccessful substitutions determining module 1502. In many embodiments, unsuccessful substitutions determining module 1502 can store computing instructions configured to run on one or more processing modules and perform one or more acts of activity 405 (FIG. 9) (e.g., activity 902 (FIG. 9)).

In many embodiments, memory storage module 1005 can comprise non-transitory memory storage module 1503. Memory storage module 1503 can be referred to as acceptance rate calculating module 1503. In many embodiments, acceptance rate calculating module 1503 can store computing instructions configured to run on one or more processing modules and perform one or more acts of activity 405 (FIG. 9) (e.g., activity 903 (FIG. 9)).

In many embodiments, memory storage module 1005 can comprise non-transitory memory storage module 1504. Memory storage module 1504 can be referred to as historical substitution score assigning module 1504. In many embodiments, historical substitution score assigning module 1505 can store computing instructions configured to run on one or more processing modules and perform one or more acts of activity 404 (FIG. 9) (e.g., activity 904 (FIG. 9)).

Although systems and methods for determining substitutions have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-15 may be modified, and that the foregoing discussion of certain of these embodiments does not necessarily represent a complete description of all possible embodiments. For example, one or more of the procedures, processes, or activities of FIGS. 4-9 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions that, when executed on the one or more processors, cause the one or more processors to perform operations comprising:
      determining a list of possible substitutes for an item of a list of items when the item of the list of items is out of stock;
      training a machine learning algorithm, using labeled training data as input and a list of possible substitutes for the item of the list of items as output;
      determining, using the machine learning algorithm, as trained, a respective similarity score for each possible substitute of the list of possible substitutes using the labeled training data;
      determining a respective historical substitution score for each possible substitute of the list of possible substitutes;
      determining a respective final score for each possible substitute of the list of possible substitutes comprises using at least one or more rectifiers having ReLU non-linearity that enables training of deep supervised neural networks without unsupervised pre-training;
      ranking each possible substitute of the list of possible substitutes based upon the respective final score for each possible substitute;
      storing a selection of a highest ranked possible substitute as additional training data with the labeled training data; and re-training the machine learning algorithm based on the additional training data and the labeled training data.

2. The system of claim 1, wherein determining the list of possible substitutes comprises:
accessing an item taxonomy database comprising a respective item taxonomy for each item in a catalog of items, wherein the catalog of items comprises the item of the list of items;
identifying a specific item taxonomy for the item of the list of items;
filtering out non-matching items of the catalog of items, wherein the non-matching items comprise a different item taxonomy than the specific item taxonomy of the item of the list of items; and
adding matching items of the catalog of items to the list of possible substitutes, wherein the matching items of the catalog of items comprise the specific item taxonomy.

3. The system of claim 1, wherein the labeled training data further comprises all positive historical acceptance data and randomly sampled negative historical acceptance data, wherein each labeled training datum of the labeled training data is labeled with at least one of:
a respective probability of a respective similarity between a respective historical title for a respective historical item and a respective historical description of a respective historical substitute;
a respective taxonomy difference for the respective historical item and the respective historical substitute;
a respective price difference between the respective historical item and the respective historical substitute; or
a respective normalized sales rank comparison for the respective historical item and the respective historical substitute.

4. The system of claim 1, wherein determining the respective similarity score for each possible substitute of the list of possible substitutes further comprises:
determining a respective title similarity score for each possible substitute of the list of possible substitutes by comparing:
a respective brand for each possible substitute of the list of possible substitutes and a brand of the item of the list of items;
a respective attribute for each possible substitute of the list of possible substitutes and an attribute of the item of the list of items; and
a respective product for each possible substitute of the list of possible substitutes and a product of the item of the list of items; and
determining the respective title similarity score for each possible substitute of the list of possible substitutes comprises using a logistic regressor trained on at least:
respective historical acceptance data for each possible substitute of the list of possible substitutes; or
manually chosen substitute data.

5. The system of claim 1, wherein determining the respective historical substitution score comprises:
determining a respective number of successful substitutions for each possible substitute of the list of possible substitutes;
determining a respective number of unsuccessful substitutions for each possible substitute of the list of possible substitutes;
calculating a respective historical acceptance rate for each possible substitute of the list of possible substitutes using the respective number of successful substitutions for each possible substitute of the list of possible substitutes and the respective number of unsuccessful substitutions for each possible substitute of the list of possible substitutes; and
assigning the respective historical substitution score based on the respective historical acceptance rate for each substitution of the list of possible substitutes and the respective number of successful substitutions for each possible substitute of the list of possible substitutes.

6. The system of claim 1, wherein determining the respective final score for each possible substitute of the list of possible substitutes further comprises:
inputting the respective similarity score for each possible substitute of the list of possible substitutes and the respective historical substitution score for each possible substitute of the list of possible substitutes into a feed-forward neural network comprising the one or more rectifiers having ReLU non-linearity, wherein the feed-forward neural network is trained without unsupervised pre-training.

7. The system of claim 1, wherein ranking each possible substitute of the list of possible substitutes comprises:
when two or more possible substitutes have approximately similar final scores, determining a quantity ratio comprising a ratio of a quantity for the item of the list of items to a respective quantity for each possible substitute of the list of possible substitutes, wherein:
the quantity for the item of the list of items comprises:
either (i) a weight of the item of the list of items or (ii) a volume of the item of the list of items, divided by a count of the item of the list of items; and
the respective quantity for each possible substitute of the list of possible substitutes comprises:
either (i) a respective weight of each possible substitute of the list of possible substitutes or (ii) a respective volume of each possible substitute of the list of possible substitutes, divided by a respective count of each possible substitute of the list of possible substitutes; and
ranking a first possible substitute of the list of possible substitutes with a first quantity ratio above a second possible substitute of the list of possible substitutes with a second quantity ratio that is higher than the first quantity ratio.

8. The system of claim 1, wherein the computing instructions, when executed on the one or more processors, further cause the one or more processors to perform operations comprising:
determining respective qualities for each possible substitute of the list of possible substitutes;
facilitating a display, on a user interface of a user device, of a highest ranked possible substitute of the list of possible substitutes;
receiving, from the user interface of the user device, the selection of the highest ranked possible substitute of the list of possible substitutes;
after receiving the selection of the highest ranked possible substitute, substituting the highest ranked possible substitute of the list of possible substitutes for the item of the list of items;
receiving a respective title for each possible substitute of the list of possible substitutes;
identifying a respective brand for each possible substitute of the list of possible substitutes using the respective title for each possible substitute of the list of possible substitutes, wherein identifying the respective brand, a respective attribute, a respective product, and a respective dietary restriction comprises using a Hidden Markov Model;

identifying the respective attribute for each possible substitute of the list of possible substitutes using the respective title for each possible substitute of the list of possible substitutes;

identifying the respective product for each possible substitute of the list of possible substitutes using the respective title for each possible substitute of the list of possible substitutes; and identifying the respective dietary restriction for each possible substitute of the list of possible substitutes using the respective title for each possible substitute of the list of possible substitutes.

9. The system of claim 1, wherein the computing instructions, when executed on the one or more processors, further cause the one or more processors to perform operations comprising:

determining respective qualities for each possible substitute of the list of possible substitutes, wherein the respective qualities for each possible substitute of the list of possible substitutes comprise:

a respective brand for each possible substitute of the list of possible substitutes;

a respective attribute for each possible substitute of the list of possible substitutes;

a respective product for each possible substitute of the list of possible substitutes; and a respective dietary restriction for each possible substitute of the list of possible substitutes.

10. The system of claim 1, wherein, the computing instructions, when executed on the one or more processors, further cause the one or more processors to perform operations comprising:

when the item is out of stock, comparing a respective dietary restriction for each possible substitute of the list of possible substitutes with a dietary restriction of the item of the list of items; and when a dietary restriction of a possible substitute of the list of possible substitutes does not match the dietary restriction of the item of the list of items, removing the possible substitute of the list of possible substitutes from the list of possible substitutes.

11. A method being implemented via execution of computing instructions configured to run on one or more processors and stored at one or more non-transitory computer-readable media, the method comprising:

determining a list of possible substitutes for an item of a list of items when the item of the list of items is out of stock;

training a machine learning algorithm, using labeled training data as input and a list of possible substitutes for the item of the list of items as output;

determining, using the machine learning algorithm, as trained, a respective similarity score for each possible substitute of the list of possible substitutes using the labeled training data;

determining a respective historical substitution score for each possible substitute of the list of possible substitutes;

determining a respective final score for each possible substitute of the list of possible substitutes comprises using at least one or more rectifiers having ReLU non-linearity that enables training of deep supervised neural networks without unsupervised pre-training;

ranking each possible substitute of the list of possible substitutes based upon the respective final score for each possible substitute;

storing a selection of a highest ranked possible substitute as additional training data with the labeled training data; and re-training the machine learning algorithm based on the additional training data and the labeled training data.

12. The method of claim 11, wherein determining the list of possible substitutes comprises:

accessing an item taxonomy database comprising a respective item taxonomy for each item in a catalog of items, wherein the catalog of items comprises the item of the list of items;

identifying a specific item taxonomy for the item of the list of items;

filtering out non-matching items of the catalog of items, wherein the non-matching items comprise a different item taxonomy than the specific item taxonomy of the item of the list of items; and adding matching items of the catalog of items to the list of possible substitutes, wherein the matching items of the catalog of items comprise the specific item taxonomy.

13. The method of claim 11, wherein the labeled training data further comprises all positive historical acceptance data and randomly sampled negative historical acceptance data, wherein each labeled training datum of the labeled training data is labeled with at least one of:

a respective probability of a respective similarity between a respective historical title for a respective historical item and a respective historical description of a respective historical substitute;

a respective taxonomy difference for the respective historical item and the respective historical substitute;

a respective price difference between the respective historical item and the respective historical substitute; or a respective normalized sales rank comparison for the respective historical item and the respective historical substitute.

14. The method of claim 11, wherein determining the respective similarity score for each possible substitute of the list of possible substitutes further comprises:

determining a respective title similarity score for each possible substitute of the list of possible substitutes by comparing:

a respective brand for each possible substitute of the list of possible substitutes and a brand of the item of the list of items;

a respective attribute for each possible substitute of the list of possible substitutes and an attribute of the item of the list of items; and a respective product for each possible substitute of the list of possible substitutes and a product of the item of the list of items; and determining the respective title similarity score for each possible substitute of the list of possible substitutes comprises using a logistic regressor trained on at least:

respective historical acceptance data for each possible substitute of the list of possible substitutes; or manually chosen substitute data.

15. The method of claim 11, wherein determining the respective historical substitution score comprises:

determining a respective number of successful substitutions for each possible substitute of the list of possible substitutes;

determining a respective number of unsuccessful substitutions for each possible substitute of the list of possible substitutes;

calculating a respective historical acceptance rate for each possible substitute of the list of possible substitutes using the respective number of successful substitutions for each possible substitute of the list of possible substitutes and the respective number of unsuccessful substitutions for each possible substitute of the list of possible substitutes; and assigning the respective historical substitution score based on the respective historical acceptance rate for each substitution of the list of possible substitutes and the respective number of successful substitutions for each possible substitute of the list of possible substitutes.

16. The method of claim 11, wherein determining the respective final score for each possible substitute of the list of possible substitutes further comprises:

inputting the respective similarity score for each possible substitute of the list of possible substitutes and the respective historical substitution score for each possible substitute of the list of possible substitutes into a feed-forward neural network comprising the one or more rectifiers having ReLU non-linearity, wherein the feed-forward neural network is trained without unsupervised pre-training.

17. The method of claim 11, wherein ranking each possible substitute of the list of possible substitutes comprises:

when two or more possible substitutes have approximately similar final scores, determining a quantity ratio comprising a ratio of a quantity for the item of the list of items to a respective quantity for each possible substitute of the list of possible substitutes, wherein:
  the quantity for the item of the list of items comprises:
    either (i) a weight of the item of the list of items or (ii) a volume of the item of the list of items, divided by a count of the item of the list of items; and
  the respective quantity for each possible substitute of the list of possible substitutes comprises:
    either (i) a respective weight of each possible substitute of the list of possible substitutes or (ii) a respective volume of each possible substitute of the list of possible substitutes, divided by a respective count of each possible substitute of the list of possible substitutes; and ranking a first possible substitute of the list of possible substitutes with a first quantity ratio above a second possible substitute of the list of possible substitutes with a second quantity ratio that is higher than the first quantity ratio.

18. The method of claim 11, wherein further comprising:
determining respective qualities for each possible substitute of the list of possible substitutes;

facilitating a display, on a user interface of a user device, of a highest ranked possible substitute of the list of possible substitutes;

receiving, from the user interface of the user device, the selection of the highest ranked possible substitute of the list of possible substitutes;

after receiving the selection of the highest ranked possible substitute, substituting the highest ranked possible substitute of the list of possible substitutes for the item of the list of items;

receiving a respective title for each possible substitute of the list of possible substitutes;

identifying a respective brand for each possible substitute of the list of possible substitutes using the respective title for each possible substitute of the list of possible substitutes, wherein identifying the respective brand, a respective attribute, a respective product, and a respective dietary restriction comprises using a Hidden Markov Model;

identifying the respective attribute for each possible substitute of the list of possible substitutes using the respective title for each possible substitute of the list of possible substitutes;

identifying the respective product for each possible substitute of the list of possible substitutes using the respective title for each possible substitute of the list of possible substitutes; and identifying the respective dietary restriction for each possible substitute of the list of possible substitutes using the respective title for each possible substitute of the list of possible substitutes.

19. The method of claim 11, wherein further comprising:
determining respective qualities for each possible substitute of the list of possible substitutes, wherein the respective qualities for each possible substitute of the list of possible substitutes comprise:
  a respective brand for each possible substitute of the list of possible substitutes;
  a respective attribute for each possible substitute of the list of possible substitutes;
  a respective product for each possible substitute of the list of possible substitutes; and
  a respective dietary restriction for each possible substitute of the list of possible substitutes.

20. The method of claim 11, further comprising:
when the item is out of stock, comparing a respective dietary restriction for each possible substitute of the list of possible substitutes with a dietary restriction of the item of the list of items; and
when a dietary restriction of a possible substitute of the list of possible substitutes does not match the dietary restriction of the item of the list of items, removing the possible substitute of the list of possible substitutes from the list of possible substitutes.

* * * * *